US012384659B2

(12) United States Patent
Zhou et al.

(10) Patent No.: US 12,384,659 B2
(45) Date of Patent: Aug. 12, 2025

(54) SMART MULTI-CAR ELEVATOR SYSTEM

(71) Applicants: Libo Zhou, Changsha (CN); Ziwei Huang, Changsha (CN)

(72) Inventors: Libo Zhou, Changsha (CN); Ziwei Huang, Changsha (CN)

(*) Notice: Subject to any disclaimer, the term of this patent is extended or adjusted under 35 U.S.C. 154(b) by 1577 days.

(21) Appl. No.: 16/640,304

(22) PCT Filed: Feb. 13, 2018

(86) PCT No.: PCT/CN2018/076634
§ 371 (c)(1),
(2) Date: Feb. 19, 2020

(87) PCT Pub. No.: WO2019/037399
PCT Pub. Date: Feb. 28, 2019

(65) Prior Publication Data

US 2020/0255261 A1 Aug. 13, 2020

(30) Foreign Application Priority Data

Aug. 19, 2017 (CN) ......................... 201710714826.8
Nov. 30, 2017 (CN) ......................... 201711237128.X

(51) Int. Cl.
*B66B 9/00* (2006.01)
*B66B 1/24* (2006.01)
(Continued)

(52) U.S. Cl.
CPC ............ *B66B 9/003* (2013.01); *B66B 1/2466* (2013.01); *B66B 1/3476* (2013.01); *B66B 5/0018* (2013.01)

(58) Field of Classification Search
CPC ....... B66B 9/003; B66B 9/00; B66B 11/0407; B66B 9/02; B66B 5/0031; B66B 7/02;
(Continued)

(56) References Cited

U.S. PATENT DOCUMENTS 10,351,390 B2* 7/2019 Gainche .................. B66B 9/003
2016/0152446 A1* 6/2016 Dudde .................... B66B 9/003 187/249
2017/0355555 A1* 12/2017 Ginsberg .................. B66B 1/40

FOREIGN PATENT DOCUMENTS

CN 201144130 Y 11/2008
CN 101875465 A 11/2010
(Continued)

OTHER PUBLICATIONS

"International Application No. PCT/CN2018/076634, International Search Report and Written Opinion mailed May 18, 2018", (May 18, 2018), 16 pgs.

*Primary Examiner* — Christopher Uhlir
(74) *Attorney, Agent, or Firm* — Schwegman Lundberg & Woessner, P.A.

(57) ABSTRACT

A smart multi-car elevator system, comprising at least two hoistways, a switch mechanism, a power mechanism and multiple cars; the hoistways are internally provided with rails for the movement of the cars, the switch mechanism is provided between adjacent hoistways, the position of the cars being switched, by means of the switch mechanism, between the adjacent hoistways; the perform, driven by the power mechanism, upward or downward movement within the hoistways or switch movement between the hoistways, and the cars are driven by the power mechanism to stop at any floor for people to get in or get out the elevator. The smart multi-car elevator system is provided with multiple individually running cars within one hoistway, improving the conveying efficiency and effectively saving the building space and building cost.

19 Claims, 24 Drawing Sheets

(51) Int. Cl.
*B66B 1/34* (2006.01)
*B66B 5/00* (2006.01)

(58) Field of Classification Search
CPC . B66B 1/2466; B66B 1/2491; B66B 11/0095; B66B 1/2433; B66B 2201/301; B66B 7/022; B66B 2201/30; B66B 11/0045; B66B 2201/307; B66B 19/007; B66B 2201/306; B66B 1/24; B66B 1/2458–28; B66B 1/34; B66B 1/3415; B66B 1/3423; B66B 1/3446–3492; B66B 1/46; B66B 11/0005; B66B 11/02; B66B 11/026; B66B 11/0226

See application file for complete search history.

(56) References Cited

FOREIGN PATENT DOCUMENTS

| | | | | | |
|---|---|---|---|---|---|
| CN | 104671029 | A | * | 6/2015 | |
| CN | 205257721 | U | | 5/2016 | |
| CN | 106927337 | A | * | 7/2017 | |
| CN | 107673162 | A | | 2/2018 | |
| CN | 111954634 | A | * | 11/2020 | ........... B66B 1/2491 |
| CN | 115535784 | A | * | 12/2022 | |
| CN | 115535807 | A | * | 12/2022 | |
| EP | 1302431 | A1 | * | 4/2003 | ......... B66B 11/0095 |
| JP | 2004269193 | A | | 9/2004 | |
| JP | 2005132527 | A | | 5/2005 | |
| WO | WO-2014158127 | A1 | * | 10/2014 | ......... B66B 11/0407 |
| WO | WO-2016126788 | A1 | * | 8/2016 | ......... B66B 11/0407 |
| WO | WO-2016207136 | A1 | * | 12/2016 | ......... B66B 11/0407 |
| WO | WO-2017093595 | A1 | * | 6/2017 | ........... B66B 1/2466 |
| WO | WO-2019037399 | A1 | * | 2/2019 | ............... B66B 1/18 |

* cited by examiner (a)

(b)

(a)

(b)

(c)

SMART MULTI-CAR ELEVATOR SYSTEM

PRIORITY CLAIM TO RELATED APPLICATIONS

This application is a U.S. national stage filing under 35 U.S.C. § 371 from International Application No. PCT/CN2018/076634, filed on 13 Feb. 2018, and published as WO2019/037399 on 28 Feb. 2019, which claims the benefit under 35 U.S.C. 119 to Chinese Application No. 201710714826.8, filed on 19 Aug. 2017, and to Chinese Application No. 201711237128.X, filed on 30 Nov. 2017, the benefit of priority of each of which is claimed herein, and which applications and publication are hereby incorporated herein by reference in their entirety.

BACKGROUND OF THE INVENTION

1. Technical Field

The present invention relates to elevators, and more particularly to an smart-car elevator system.

2. Description of Related Art

The conventional elevators are mainly elevators with traction sheaves and shafts. Each shaft only allows one elevator car to run therein between at least two rows of rigid guides that are vertical or inclined at an angle smaller than 15°. While elevators implementing such a structure are competent for low- and middle-rise height buildings, they are imperfect for high-rise buildings springing up in modern cities for their low transportation efficiency and long waiting time. Besides, during regular maintenance and breakdown repair, the entire shaft is out of service. Additionally, safety is another concern. As a scheme, many high-rise buildings have multiple shafts and elevator cars to satisfy user needs with increased transportation capacity. However, the increased number of elevator shafts unavoidably takes increased space in buildings and requires increased building costs, yet this scheme is unable to solve the problem of the conventional elevators about low transportation efficiency.

There are also some methods in the art for running and controlling multiple elevator cars in one elevator shaft, for providing a plurality of parallel elevator shafts that accommodate elevators and for transferring an elevator car from one elevator shaft to another elevator shaft. These known elevators having plural elevator shafts still have shortcomings about collision between elevator cars and in turn the slow speed of elevator cars because the elevator shafts are located in the same hoistway. All these make the conventional elevators limited in transportation capacity and incompetent for peak transportation demands.

SUMMARY OF THE INVENTION

To address the technical issues left unsolved by the prior art, the present invention provides a smart-car elevator system, which has a plurality of elevator cars independently running in one hoistway, thereby significantly increasing transportation efficiency and effectively saving building space and building costs.

To address the foregoing technical issues, the present invention provides a technical scheme, wherein:

a smart multi-car elevator system comprises at least two hoistways, a switching mechanism, a power mechanism and a plurality of elevator cars, wherein the shafts are equipped therein rails for the elevator cars to move along, the switching mechanism is provided between adjacent said hoistways, the elevator cars is configured to be positionally switched between the adjacent hoistways by the switching mechanism to perform lifting or lowering movement or switching movement and when driven by a power mechanism stop at one of floors to allow passenger access.

As further improvements on the foregoing technical scheme:

the system comprises at least two adjacent said hoistways, and the elevator cars are configured to perform the upward-moving/downward-moving movement in the hoistways simultaneously, in which each said floor is equipped with one said switching mechanism.

At least one of the at least two hoistways is an upward shaft, and the other one is a downward shaft, in which each said floor is provided with both an upward elevator gateway and a downward elevator gateway located at two sides of the hoistways, respectively.

Each said hoistway is equipped therein with an operation rail so that the elevator cars when driven by the power mechanism moves upward or downward along the operation rail.

The switching mechanism comprises switching rails which are hinged inside the hoistways and arranged in a length direction of the shafts so that the vertically adjacent said switching rails are connected in a head-to-tail manner and each said floor has one said switching rail.

The switching mechanism further comprises switching drivers and the switching rails are arranged in pairs, so that each said switching rail has one switching driver, in which the switching rail is centrally hinged to the shaft and is driven by the switching driver to rotate to become connected to or disconnected from the rails in the adjacent hoistway.

The switching rail is curved in shape.

The switching driver is a hydraulic jack that is fixed inside the hoistway.

The operation rail and switching rail are both rack rails each composed of a steel frame, a fixing groove and a rack, in which the steel frame has one side thereof provided with the rack and an opposite side thereof provided with the fixing groove, so that the rack and power mechanism are engaged with each other while the fixing groove and power mechanism are meshed with each other.

The system further comprises a transfer mechanism, and a first floor in the floors has a plurality of elevator gateways, in which the transfer mechanism is installed on the first floor so that the elevator cars move among the elevator gateways through the transfer mechanism.

The transfer mechanism comprises a transfer cart and a plurality of transfer rails, in which each said elevator gateway corresponds to one said transfer cart, and the hoistway is connected to the elevator gateways at laterals thereof, so that the transfer cart moves along the transfer rails and the elevator cars move between the elevator gateways and the shafts through the transfer carts.

The system further comprises a bottom-floor service mechanism located on a bottom floor that is below the first floor among the floors, and the bottom-floor service mechanism comprises a circular rail and the transfer carts, the hoistway is located on the circular rail, the elevator cars moving downward along the hoistway to the circular rail, the elevator cars moving on the circular rail through the transfer carts, and the elevator cars resting on the circular rail when not in use.

The bottom-floor service mechanism further comprises a service rail that is communicated with two sides of the circular rail.

The transfer rails, the circular rail and the service rail are all rack rails each composed of a steel frame, a fixing groove and a rack, in which the steel frame has one side thereof provided with the rack and an opposite side thereof provided with the fixing groove, so that the rack and power mechanism are engaged with each other while the fixing groove and power mechanism are meshed with each other.

The transfer cart has a bottom thereof provided with casters.

The power mechanism comprises a primary power mechanism and a switching power mechanism, and the primary power mechanism comprises a motor, a gear wheel, a crawler bearing, a support plate and a mount, wherein the support plate is mounted on the mount, the motor and the crawler bearing are mounted on the support plate, the gear wheel is driven by the motor, the gear wheel is engaged with the rack, the crawler bearing is meshed with the fixing groove; the switching power mechanism comprises a roller guide, a spring and a restrainer, the mount is fixed to a slide rod of the roller guide, a slider of the roller guide is fixed to the elevator car, the slider is mounted around the slide rod; the spring has one end thereof fixed to the elevator car through a spring retaining plate and an opposite end thereof fixedly connected to the restrainer, the restrainer is connected to the slide rod, and the restrainer controls the slide rod to slide or stop.

A shock absorber is provided between the support plate and the mount.

The restrainer comprises a rail switching lock and a push chunk, the rail switching lock is mounted on the elevator car, the push chunk is fixed to the slide rod, the spring has an opposite end thereof fixed to the push chunk, the rail switching lock is located on one side of the push chunk that is connected to the spring, and the rail switching lock limits the push chunk from displacement. There are four said power mechanisms mounted in pair and symmetrically on two opposite sides of the elevator car, respectively.

The system further comprises a top-floor rail mechanism located on a top floor among the floors and comprising an elliptic, closed top-floor rail and a plurality of top-floor carts, the top-floor rail is linked with the hoistway so that the top-floor carts slides on the top-floor rail, and the elevator cars are configured to switch positions between the hoistways through the top-floor carts.

As another mode of the foregoing technical scheme:

There are two said hoistways, one of which is an upward shaft, and the other of which is a downward shaft, in which the switching mechanism is provided between the two hoistways, and the elevator cars are configured to switch between the upward shaft and the downward shaft through the switching mechanism.

As a third mode of the foregoing technical scheme:

There are three said hoistways, including an upward shaft, a downward shaft and an auxiliary shaft, the auxiliary shaft is located between the upward shaft and the downward shaft, the switching mechanism is provided between two adjacent said hoistways, the elevator cars switch between the upward shaft and the auxiliary shaft, or between the downward shaft and the auxiliary shaft through the switching mechanisms.

The switching mechanism between the upward shaft and the auxiliary shaft is connected to the switching mechanism between the downward shaft and the auxiliary shaft in a head-to-tail manner.

As a fourth mode of the foregoing technical scheme:

There are four said hoistways, including in sequence an upward shaft, an auxiliary upward shaft, an auxiliary downward shaft and a downward shaft, and the switching mechanism are provided between two adjacent said hoistways, so that the elevator cars switch between the upward shaft and the auxiliary upward shaft, between the downward shaft and the auxiliary downward shaft or between the auxiliary upward shaft and the auxiliary downward shaft through the switching mechanisms.

The switching mechanisms in the adjacent hoistways are connected in a head-to-tail manner.

As a fifth mode of the foregoing technical scheme:

There are six said hoistways, including in sequence an upward shaft, an auxiliary upward shaft, an upward fast shaft, a downward fast shaft, an auxiliary downward shaft and a downward shaft, and the switching mechanisms are provided between two adjacent said hoistways, so that the elevator cars switch between the adjacent hoistways through the switching mechanisms.

The switching mechanism comprises a pulley and a slideway assembly that has at least two telescoped slideways, in which each said slideway has a length equal to or greater than a width of the adjacent hoistway, the slideway driven by the slideway driver to slide with respect to the other slideway to extend or retract, and the pulley being slidably mounted on the slideway.

As a sixth mode of the foregoing technical scheme:

The system further comprises a primary rail mechanism, a secondary rail mechanism, a transfer mechanism, and a bottom-floor service mechanism, the switching mechanisms linking the primary rail mechanism and the secondary rail mechanism, the elevator cars switch between the primary rail mechanism and the secondary rail mechanism when driven by the switching mechanisms; the transfer mechanism is located on a first floor among the floors that is immediately on the ground, plural said elevator cars, when driven by the transfer mechanism, move among a plurality of elevator entrances of the first floor; the bottom-floor service mechanism is installed in a basement under the ground, the bottom-floor service mechanism is located at bottoms of the primary rail mechanism and the secondary rail mechanism, the bottom-floor service mechanism is connected to each said elevator entrance of the first floor; the elevator cars, when driven by the power mechanism, perform lifting or lowering movement or switching movement; during operation, the elevator cars move upward or downward simultaneously in the primary rail mechanism, and each said elevator car, when driven by the switching mechanism, respectively switches from the primary rail mechanism to the secondary rail mechanism for allowing passenger access.

The primary rail mechanism comprises an upward primary rail and a downward primary rail, and the secondary rail mechanism comprises an upward secondary rail and a downward secondary rail, in which the upward secondary rail and the downward secondary rail are located between the upward primary rail and the downward primary rail, and floor access channels are located between the upward secondary rail and the downward secondary rail.

The switching mechanism comprises a plurality of curved switching rails that are arranged alternately and in pairs in an upward or downward direction of the elevator cars and switching drivers; when used in pairs, one of the paired switching rails is located at a center of the upward primary rail or of the downward primary rail, and the other switching rail is located at a center of the upward secondary rail or of the downward secondary rail, each said switching rail is provided with one said switching driver, the switching rail is centrally hinged to the shaft, the switching rail, when driven by the switching driver, rotates to become connected with the primary rail mechanism and the secondary rail mechanism or to become away from the primary rail mechanism and the secondary rail mechanism.

The primary rail mechanism and the secondary rail mechanism are divided into n units according to a number of the floors, and each said unit has an upper end and a lower end thereof provided with the switching mechanisms in which the switching rails at the upper end and the lower end are arranged symmetrically.

The upward primary rail, the downward primary rail, the upward secondary rail, the downward secondary rail and the switching rail are all rack rails each composed of a steel frame, a fixing groove and a rack, in which the steel frame has one side thereof provided with the rack and an opposite side thereof provided with the fixing groove, so that the rack and power mechanism are engaged with each other while the fixing groove and power mechanism are meshed with each other.

The transfer mechanism comprises transfer carts and a plurality of transfer rails, and the first floor has a plurality of elevator entrances, the elevator entrances are arranged into two rows, each said elevator entrance is provided with one said transfer cart, the primary rail mechanism is linked to a center of the transfer rail, the transfer cart moves on the transfer rail, and each said transfer cart is connected to the primary rail mechanism through transfer rail, so that the elevator cars are transported to the elevator entrances by the transfer carts.

The bottom-floor service mechanism comprises a circular rail and the transfer carts, the hoistways are located on the circular rail, the elevator cars move downward along the hoistway to the circular rail and then are moved on the circular rail by the transfer carts, in which the elevator cars rest on the circular rail when not in use.

The bottom-floor service mechanism further comprises two service rails that are perpendicular to the circular rail, respectively.

The transfer rails, the circular rail and the service rails are all rack rails, each composed of a steel frame, a fixing groove and a rack, in which the steel frame has one side thereof provided with the rack and an opposite side thereof provided with the fixing groove, so that the rack and power mechanism are engaged with each other while the fixing groove and power mechanism are meshed with each other.

The transfer cart has a bottom thereof provided with casters.

The power mechanism comprises a primary power mechanism and a switching power mechanism, the primary power mechanism comprises a motor, a gear wheel, a crawler bearing, a support plate and a mount, the support plate is mounted on the mount, the motor and the crawler bearing are mounted on the support plate, the gear wheel is driven by the motor, the gear wheel is engaged with the rack, the crawler bearing is meshed with the fixing groove; the switching power mechanism comprises a roller guide, a spring and a restrainer, the mount is fixed to a slide rod of the roller guide, a slider of the roller guide is fixed to the elevator car, the slider is mounted around the slide rod; the spring has one end thereof fixed to the elevator car through a spring retaining plate and an opposite end thereof fixedly connected to the restrainer, the restrainer is connected to the slide rod, and the restrainer controls the slide rod to slide or stop.

A shock absorber is provided between the support plate and the mount.

The restrainer comprises a rail switching lock and a push chunk, wherein the rail switching lock is mounted on the elevator car, the push chunk is fixed to the slide rod, the spring has an opposite end thereof fixed to the push chunk, the rail switching lock is located on one side of the push chunk that is connected to the spring, and the rail switching lock limits the push chunk from displacement.

There are four said power mechanisms mounted in pair and symmetrically on two opposite sides of the elevator car, respectively.

The system further comprises a top-floor rail mechanism, the top-floor rail mechanism comprises an elliptic, closed top-floor rail and a plurality of top-floor carts, the top-floor rail is connected to the primary rail mechanism and the secondary rail mechanism, so that the top-floor carts slides on the top-floor rail, in which the primary rail mechanism and the secondary rail mechanism are connected through the top-floor carts.

The primary rail mechanism and the secondary rail mechanism are divided into n units according to a number of the floors, and each said unit is provided with the switching mechanism.

The primary rail mechanism comprises an upward main chain rail and a downward main chain rail each provided with a plurality of car lifting platforms so that each said elevator car corresponds to one said car lifting platform, and the elevator cars, when being on the primary rail mechanism, are driven by the car lifting platforms to perform lifting or lowering movement.

As a seventh mode of the foregoing technical scheme:

The secondary rail mechanism is divided into an upward secondary mechanism and a downward secondary mechanism located between the upward main chain rail and the downward main chain rail, and floor access channels are located between the upward secondary mechanism and the downward secondary mechanism, the secondary rail mechanism comprises hoist devices so that each said unit is provided with one said hoist device, the hoist device comprises a hoist box, a hoist rope and a cage, the hoist box is fixed to a top of the corresponding unit, the hoist rope has one end thereof wound on the hoist box and an opposite end fixedly connected to the cage, the cage has an approach to the elevator car at one side thereof that faces the car lifting platform, and the hoist box drives the cage to perform lifting or lowering movement through the hoist rope.

The switching mechanism comprises a gangway that is hinged to a lateral of the cage and is driven by a cylinder to rotate to abut against the cage or link the car lifting platform.

The secondary rail mechanism further comprises a weight that is fixedly connected to one end of the hoist rope.

The car lifting platform is provided with a positioning recess, and the elevator car has a bottom thereof provided with a positioning bulge configured to be securely received in the positioning recess.

The car lifting platforms and the cages each has a hydraulic jack for driving the elevator cars to move.

The primary rail mechanism further comprises an auxiliary fixed guide, and the elevator car is provided with a stabilizing brace that has one end thereof hinged to the elevator car and an opposite end thereof fittingly connected to the auxiliary fixed guide, so that the stabilizing brace slides along the auxiliary fixed guide and when driven by a cylinder rotates to become connected to or away from the auxiliary fixed guide.

There are four said upward main chain rails and four said downward main chain rails arranged at four corners of the elevator car, respectively, and each said upward main chain rail or downward main chain rail is provided with one said auxiliary fixed guide.

The transfer mechanism comprises transfer cart, a plurality of transfer rail and auxiliary transfer hoistway, and the first floor has a plurality of elevator entrances, the elevator entrances are arranged into two rows, not all elevator doors are aligned with the corresponding elevator entrances, the primary rail mechanism and the secondary rail mechanism are vertically arranged between the two rows of the elevator entrances, the secondary rail mechanism is located between the upward main chain rail and the downward main chain rail; two said auxiliary transfer hoistways are located at outsides of the upward main chain rail and the downward main chain rail, respectively; each said elevator entrance is provided with one said transfer cart, the secondary rail mechanism is linked to the elevator entrances directly or through the auxiliary transfer hoistway by the through transfer rails, and the transfer carts are configured to move on the transfer rails, so that the elevator cars are transported to the elevator entrances by the transfer carts.

The auxiliary transfer hoistway is located in the bottommost floor unit, and the auxiliary transfer hoistway is provided therein with the hoist device and the switching mechanism.

The system further comprises a top-floor rail mechanism, the top-floor rail mechanism comprises an elliptic, closed top-floor rail, two auxiliary lifting hoistways and at least one top-floor cart, the top-floor cart is slidably mounted on the top-floor rail, and the upward secondary mechanism, the downward secondary mechanism and the auxiliary lifting hoistway are linked through the top-floor cart.

There are two said auxiliary lifting hoistways that are located in the topmost floor unit and outside the primary rail mechanism, and the auxiliary lifting hoistways are each provided with the hoist device and the switching mechanism.

Each said floor is provided with the car lifting platform.

The system further comprises a smart control system that has a weight detecting module, a sensing module, a processing module and a safety module;

the weight detecting module is mounted on the elevator cars, for recording weights of the elevator cars on each said floor in each time window, and providing recorded data to the processing module for storage and for development of a database;

the sensing module detects running speeds and temperatures of the elevator cars, and provides detected data to the processing module;

the processing module identifies peak hours and intensively accessed floors according to the data in the database, and allocates a number of said elevator cars to be dispatched accordingly; and when determining that the system has a breakdown, the processing module signals the safety module to reduce a number of said elevator cars to release.

The disclosed smart-car elevator system is suitable for passenger elevators and goods lifts of high-rise residential buildings, office buildings, and large malls, and has the following advantages over the conventional elevators:

(1) The smart multi-car elevator system of the present invention has high transportation efficiency, with one elevator car running in multiple hoistways, and one hoistway allowing multiple elevator cars to move therein simultaneously without mutual interference, thereby significantly shortening passengers' waiting time during peak hours. Taking a 50-storybuilding as an example, each said unit may cover 4 floors. Depending on various parameters, assuming that the maximum running speed of the elevator is 4 m/s, the urgent braking acceleration is about 5 m/s$^2$, and the minimum safety distance between the elevator cars is about 4 m. A dual-hoistway parallel elevator runs at least 14 elevator cars simultaneously, having its transportation capacity equivalent to 7 times of that of an ordinary elevator. A three-hoistway parallel elevator runs at least 27 elevator cars simultaneously, having its transportation capacity equivalent to 9 times of that of an ordinary elevator. A four-hoistway parallel elevator runs at least 40 elevator cars simultaneously, having its transportation capacity equivalent to 10 times of that of an ordinary elevator.

(2) The smart multi-car elevator system of the present invention is suitable for passenger elevators and goods lifts of high-rise residential buildings, office buildings, and large malls. It has good transportation efficiency because multiple elevator cars can move in the same hoistway simultaneously, without mutual interference therebetween, thereby significantly shortening passenger's waiting time during peak hours. Taking a building having 80 floors for example, assuming that the safety distance is two floors, there may be 20 upward units and 20 downward units, and each unit runs two elevator cars simultaneously. Since there are up to 80 elevator cars running simultaneously on the secondary rail and 80 elevator cars running simultaneously on the primary rail, the entire elevator system can have up to 160 elevator cars.

(3) The smart multi-car elevator system of the present invention is safe because it uses the gear wheel to drive the system, and eliminates the risks of hoist rope break and elevator car drop. The disclosed elevator system has large capacity, stable structure and high reliability, and is convenient to maintain and repair, thereby ensuring safety.

(4) The smart multi-car elevator system of the present invention is economic for it takes smaller area in a building and area, thereby saving building area and building costs.

(5) The smart multi-car elevator system of the present invention remains normal operation even when the passenger flow is high or when there is any elevator broken in some hoistway, thereby saving time and improving working efficiency.

BRIEF DESCRIPTION OF THE DRAWINGS

FIG. 16(*b*) is a schematic structural drawing showing the switching rail extended.

FIG. 17(*b*) is a schematic drawing illustrating the switching rail extended for switching elevator cars.

FIG. 17(*c*) is a schematic drawing illustrating the switching rail retracted.

FIG. 23(*b*) is a schematic drawing of Embodiment 5 of the present invention showing a slideway extended.

Figure 1:
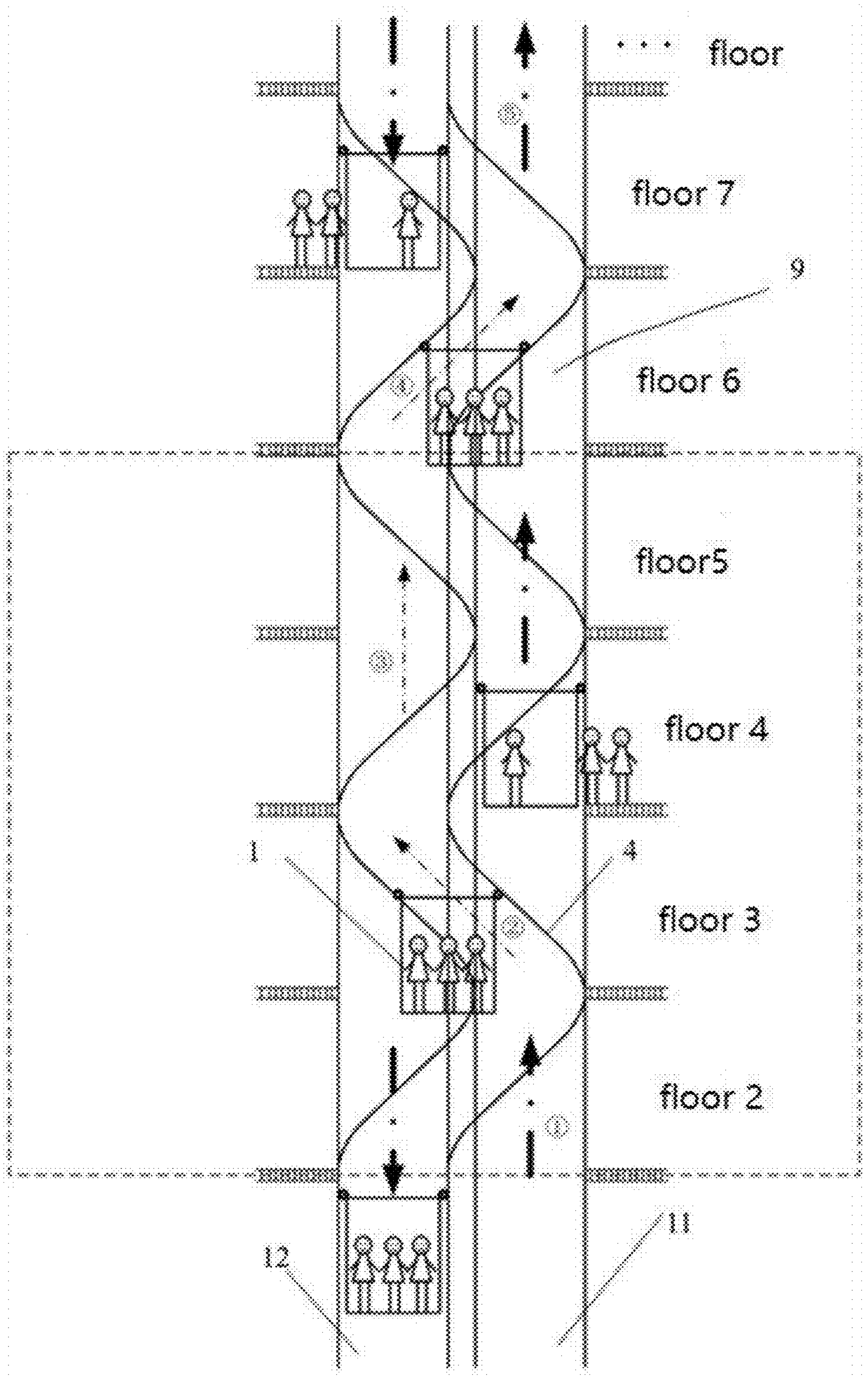
FIG. 1 is a track graph of a two-shaft elevator system according to Embodiment 1 of the present invention.
Figure 2:
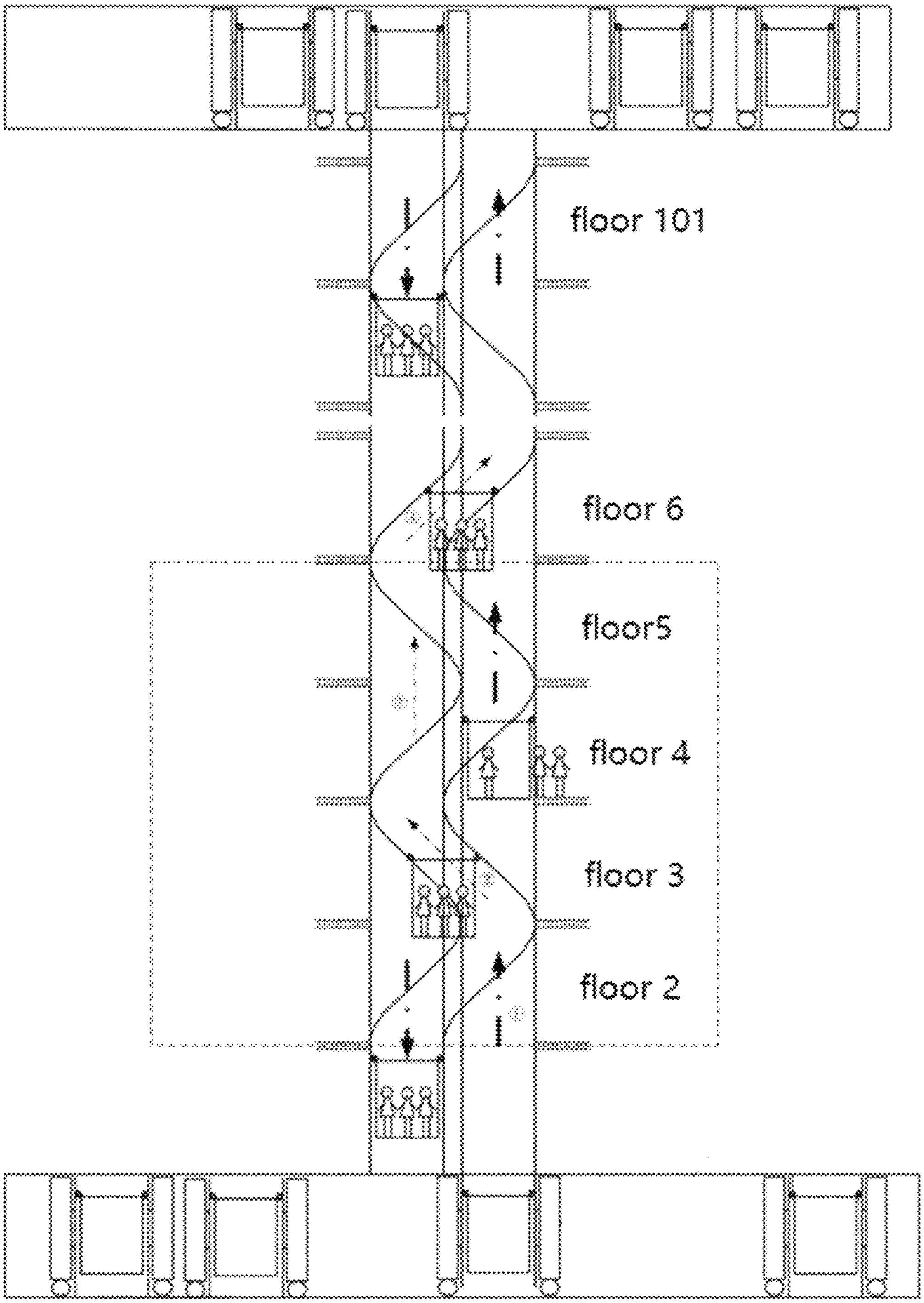
FIG. 2 is a schematic structural drawing of the two-shaft elevator system of the present invention.

LIST OF REFERENCE NUMBERS IN THE DRAWINGS 1. elevator car; 11. upward shaft; 12. downward shaft; 13. auxiliary shaft; 14. auxiliary upward shaft; 15. auxiliary downward shaft; 16. upwardfast shaft; 17. downward-fast shaft; 18. stabilizing brace;
2. primary rail mechanism; 21. upward primary rail; 22. downward primary rail; 23. steel frame; 24. fixing groove; 25. rack; 26. upward main chain rail; 27. downward main chain rail; 28. car lifting platform; 281. positioning recess; 29. auxiliary fixed guide;
3. secondary rail mechanism; 31. upward secondary rail; 32. downward secondary rail; 33. hoist box; 34. hoist rope; 35. cage; 36. weight;
4. switching mechanism; 41. switching rail; 42. switching driver; 43. gangway; 44. slideway; 45. pulley;
5. transfer mechanism; 51. transfer cart; 52. transfer rail; 53. auxiliary transfer hoistway;
6. bottom-floor service mechanism; 61. circular rail; 62. service rail;
7. power mechanism; 71. motor; 72. gear wheel; 73. crawler bearing; 74. support plate; 741. shock absorber; 75. mount; 76. roller guide; 761. slide rod; 762. slider; 77. spring; 771. spring retaining plate; 78. rail switching lock; 79. push chunk;
8. top-floor rail mechanism; 81. top-floor rail; 82. top-floor cart; 83. auxiliary lifting hoistway;
9. hoistway.

DETAILED DESCRIPTION OF THE INVENTION

The invention as shaft as a preferred mode of use, further objectives and advantages thereof will be best understood by reference to the following detailed description of illustrative embodiments when read in conjunction with the accompanying drawings.

Embodiment 1

FIG. 1, FIG. 2, FIG. 9 through FIG. 20 illustrate a first mode of a smart multi-car elevator system of the present invention. The system comprises two adjacent hoistways 9, switching mechanisms 4, power mechanisms 7 and a plurality of elevator cars 1. The elevator cars 1 are configured to perform upward-moving/downward-moving movement in the hoistways 9 simultaneously. Each of floors has a switching mechanism 4. The elevator car 1 is switched between the two hoistways 9 by means of the switching mechanism 4. The elevator car 1 when driven by the power mechanism 7 performs lifting or lowering movement or switching movement. The elevator car 1 is driven by the power mechanism 7 to stop at any one of plural floors for passenger access.

In the present embodiment, all the rails are arranged in pairs.

In the present embodiment, one of the two hoistways 9 is an upward shaft 11 and the other is a downward shaft 12. Each floor has an upward elevator gateway and a downward elevator gateway, respectively. The upward elevator gateway and the downward elevator gate way are located at two sides of the hoistways 9, respectively. The hoistway 9 is provided therein with an operation rail. The elevator car 1 when driven by the power mechanism 7 moves upward or downward along the operation rail.

Figure 15:
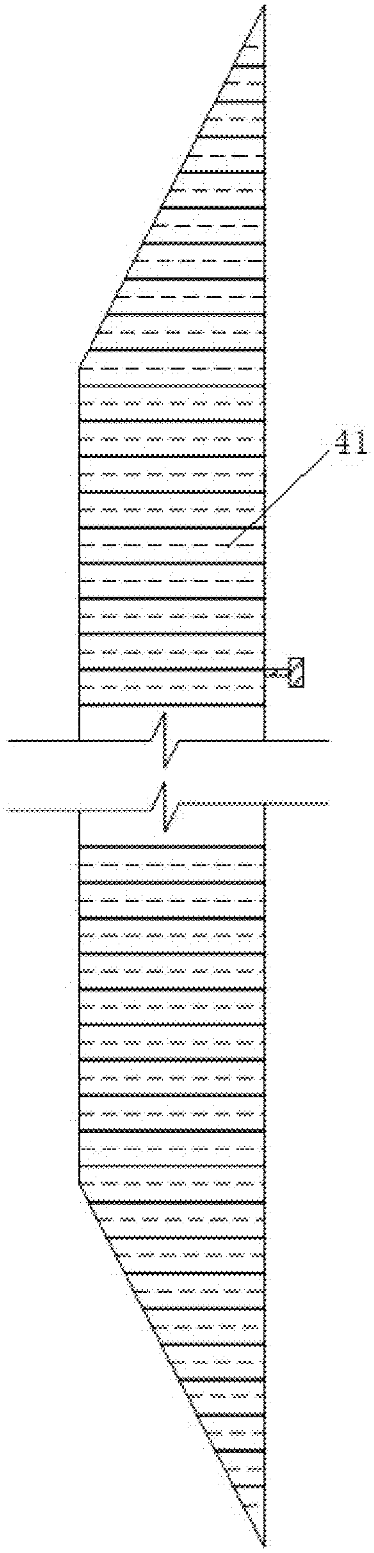
FIG. 15 is a schematic structural drawing of a switching rail according to the present invention.
Figure 16A:
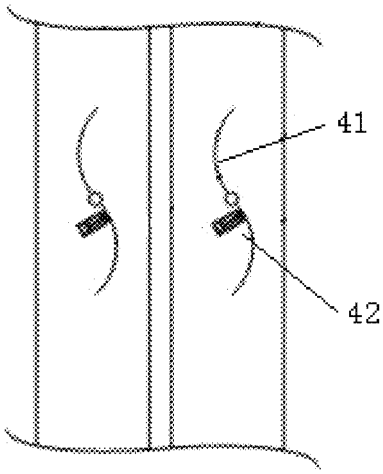
FIG. 16(*a*) is a schematic structural drawing showing the switching rail retracted.
Figure 16B:
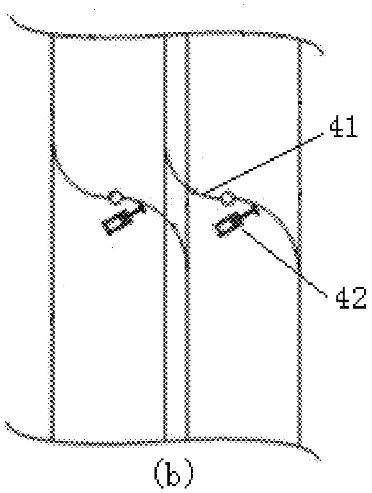
Figure 17A:
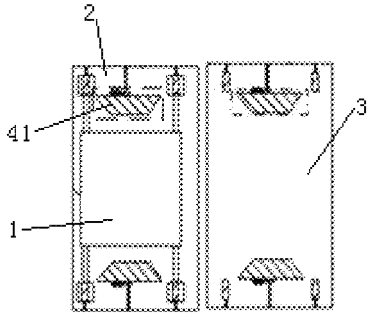
FIG. 17(*a*) is a schematic drawing depicting the switching rail prior to extension.
Figure 17B:
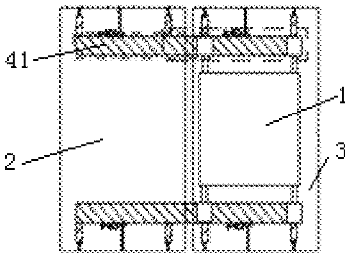
Figure 17C:
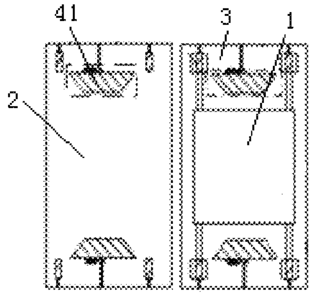

As shown in FIG. 15 through 17, in the present embodiment, the switching mechanism 4 comprises a switching rail 41 and a switching driver 42. The switching rail 41 is curved in shape and has two beveled ends. Each switching rail 41 is provided with one switching driver 42. The switching driver 42 is a hydraulic jack that is fixed inside the hoistway 9. The switching rails 41 are arranged in pairs, wherein one switching rail 41 is centrally hinged inside the hoistway 9 of the upward shaft 11 and the other switching rail 41 is centrally hinged inside the hoistway 9 of the downward shaft 12. The switching rail 41 has a plurality of vertically adjacent switching rails 41 arranged in the length direction of the hoistway 9 and connected in a head-to-tail manner. Each of the floors has a switching rail 41. As shown in FIG. 16(*a*) and FIG. 16(*b*), the switching rail 41 when driven by the hydraulic jack rotates to extend and become connected to the operation rails in the two corresponding hoistways 9, or to retract and separate from the operation rails in the two hoistways 9. When all the switching rails 41 are connected to the operation rails, they form a continuous "S" shape and adjacent switching rails 41 are connected in a head-to-tail manner.

In the present embodiment, the operation rail and the switching rail 41 are both rack rails. The rack rail is composed of a steel frame 23, a fixing groove 24 and a rack 25. The steel frame 23 has its one side provided with the rack 25 and the other side provided with the fixing groove 24. The rack 25 and the power mechanism 7 engaged with each other. The fixing groove 24 and the power mechanism Tare meshed with each other. The power supply and signal rails of the elevator system are installed atone side of the fixing groove 24. Every rack rail has two power supply/signal wire rails, respectively, that are connected to the power mechanism 7.

As shown in FIG. 17(*a*) through FIG. 17(*c*), when the elevator car 1 is to be switched from the upward shaft 11 to the downward shaft 12, the power mechanism 7 receives a control signal and makes the hydraulic jack to act on the switching pivot of the switching rail 41, so as to extend the switching rail 41 to connect the upward shaft 11 and the downward shaft 12. After the elevator car 1 enters the downward shaft 12, the hydraulic jack gradually reduces the pushing force applied to the switching rail 41, so the switching rail 41 retracts, and the upward shaft 11 and the downward shaft 12 return to normal operation.

Figure 20:
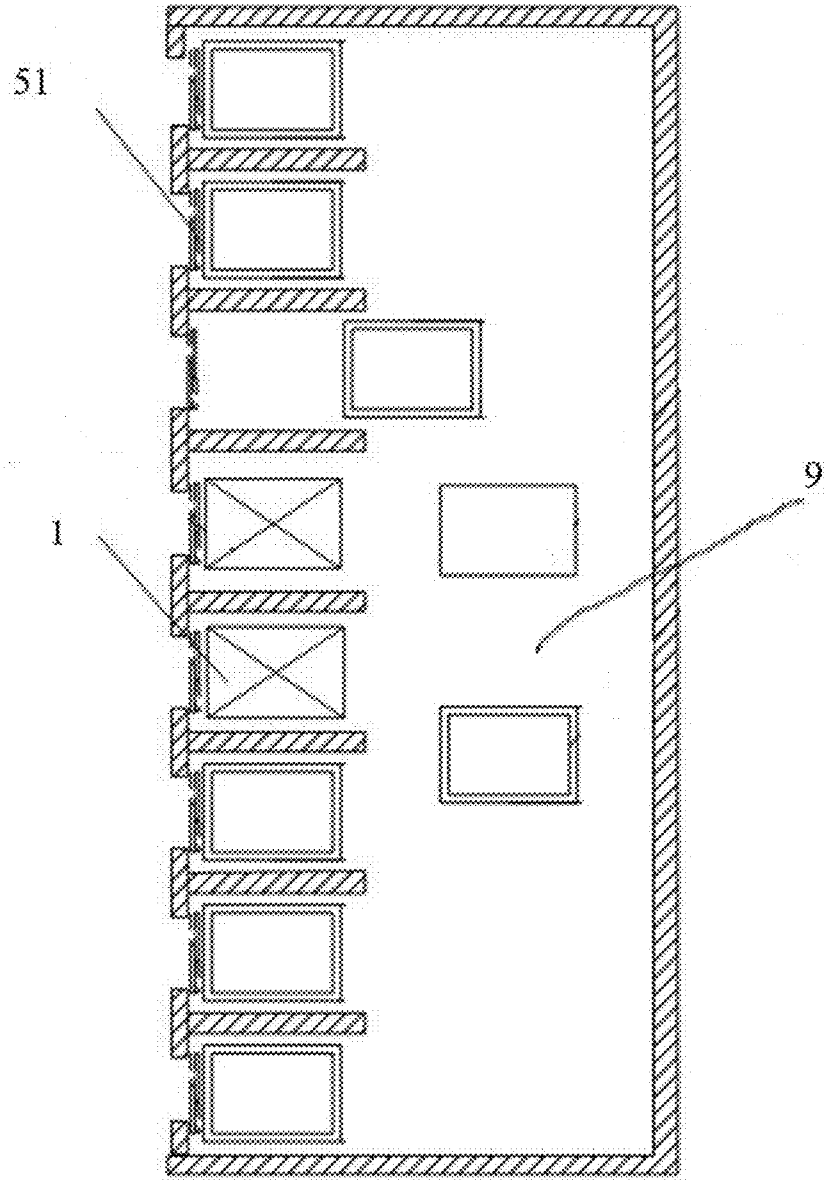
FIG. 20 is a schematic structural drawing of a transfer mechanism according to the present invention.

As shown in FIG. 20, in the present embodiment, the system further comprises a transfer mechanism 5. The transfer mechanism 5 is installed on the first floor. The transfer mechanism 5 comprises a transfer cart 51 and a plurality of transfer rails 52. The first floor among the floors has a plurality of elevator gateways, each corresponding to one transfer cart 51. The upward shaft 11 and the downward shaft 12 are linked to the lateral of the elevator gateways. The transfer cart 51 moves on the transfer rails 52. The elevator car 1 moves between the elevator gateway and the upward shaft 11 or the downward shaft 12 by means of the transfer cart 51. The transfer cart 51 has its bottom provided with casters, allowing it to move in multiple directions. For changing direction, the elevator car 1 moves with no turns but only shifts between two vertical rails of the transfer rails 52. To allow the elevator cars 1 to move upward, they are transported by the transfer carts 51 from the elevator gateways to the upward shaft 11 along the transfer rails 52. To allow the elevator cars 1 to move downward, they move along the downward shaft 12 to the first floor and then transported by the transfer carts 51 to different elevator gateways for passenger drop-off.

Figure 19:
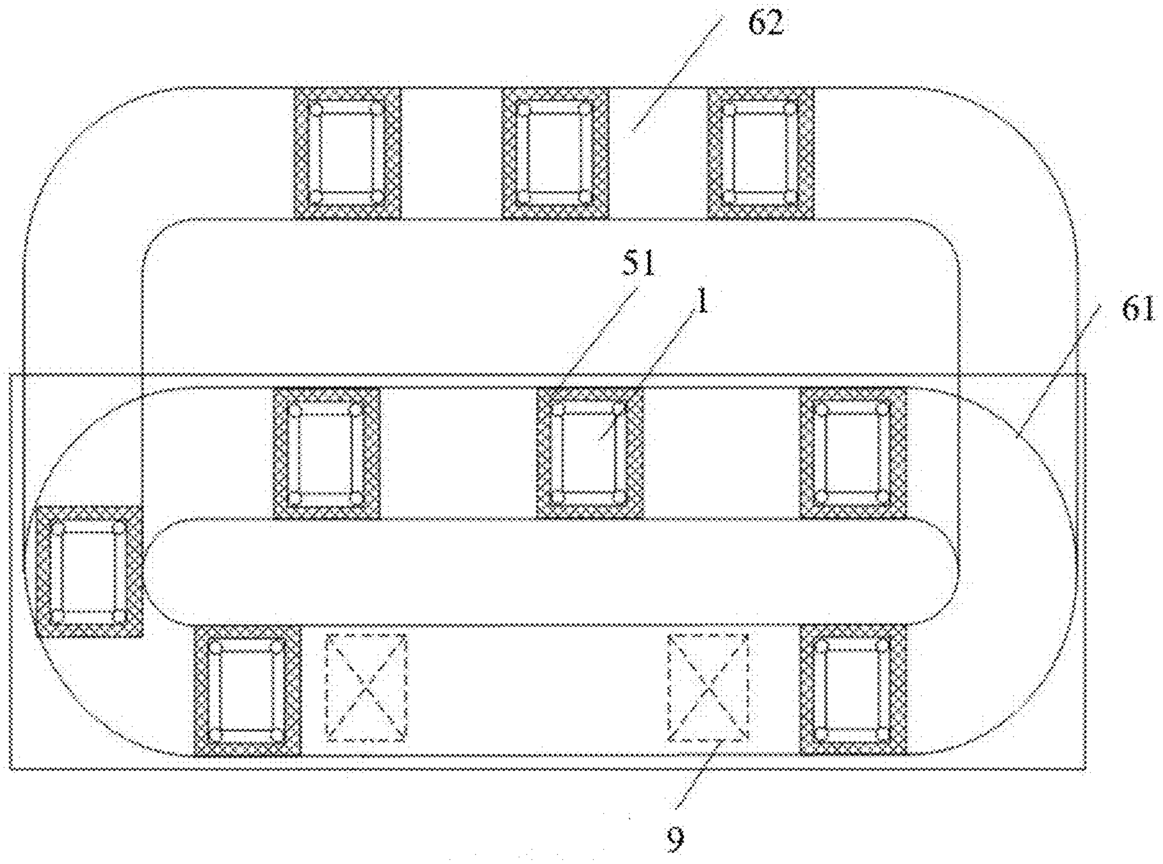
FIG. 19 is a schematic structural drawing of a bottom-floor service mechanism according to the present invention.

As shown in FIG. 19, in the present embodiment, the system further comprises a bottom-floor service mechanism 6. The bottom-floor service mechanism 6 is located on the bottom floor below the first floor. In a building having an underground parking garage, the bottom-floor is the floor below the floor having the parking garage. The bottom-floor service mechanism 6 must be located on the bottommost floor of a building. The bottom-floor service mechanism 6 comprises a circular rail 61 and a transfer cart 51. The upward shaft 11 and the downward shaft 12 are linked to the circular rail 61. The elevator car 1 moves downward from the downward shaft 12 to the circular rail 61, and then driven to move on the circular rail 61 by the transfer cart 51. The elevator car 1 when not in use rests on the circular rail 61. To go upward, the elevator car 1 is transported to the upward shaft 11 along the circular rail 61 by the transfer cart 51. Elevator cars are randomly sent to the upward shaft 11.

In the present embodiment, the bottom-floor service mechanism 6 further comprises a service rail 62. The service rail 62 is communicated with two sides of the circular rail 61. When the elevator car 1 is broken or needs services, it is transported to the service rail 62, without interfering with other elevator cars 1.

In the present embodiment, the transfer rails 52, the circular rail 61 and the service rail 62 are all rack rails. The rack rail is composed of a steel frame 23, a fixing groove 24 and a rack 25. The steel frame 23 has its one side provided with the rack 25, and the other side provided with the fixing groove 24. The rack 25 and the power mechanism 7 are engaged with each other. The fixing groove 24 and the power mechanism 7 are meshed with each other.

As shown in FIG. 9 through FIG. 12, in the present embodiment, the power mechanism 7 comprises a primary power mechanism and a switching power mechanism. The primary power mechanism comprises a motor 71, a gear wheel 72, a crawler bearing 73, a support plate 74 and a mount 75. The mount 75 is an L-shaped steel plate. The support plate 74 is mounted on one side of the mount 75. A shock absorber 741 is provided between the support plate 74 and the mount 75. The motor 71 and crawler bearing 73 are mounted on the support plate 74. The gear wheel 72 is driven by the motor 71. The gear wheel 72 and the rack are engaged with each other. The crawler bearing 73 and the fixing groove 24 are meshed with each other. A stabilizer bearing is installed on one side of the drive shaft of the gear wheel 72 for ensuring stable operation. Controllers are installed on two ends of the support plate 74 near the crawler bearing 73 for receiving power and signals.

The switching power mechanism comprises a roller guide 76, a spring 77 and a restrainer. The mount 75 has the other side fixed to the slide rod 761 of the roller guide 76. The slider 762 of the roller guide 76 is fixed to the elevator car 1. The slide rod 761 is slidably mounted in the slider 762. The spring 77 has its one end fixed to the elevator car 1 through a spring retaining plate 771, and has the other end fixedly connected to the restrainer. There strainer is connected to the slide rod 761. There strainer controls the slide rod 761 to slide or stop, thereby ensuring safe switching.

In the present embodiment, the restrainer comprises a rail switching lock 78 and a push chunk 79. The rail switching lock 78 is mounted on the elevator car 1. The push chunk 79 is fixed to the slide rod 761. The spring 77 has the other end fixed to the push chunk 79. The rail switching lock 78 is located on the side of the push chunk 79 that is connected to the spring 77. The rail switching lock 78 prevents the push chunk 79 from displacement.

There are two switching power mechanisms. The mount 75 is fixed to the two slide rods 761. There are four sliders 762, two for each slide rod 761. The mount 75 is located between the two sliders 762. Movement of the slide rod 761 drives the primary power mechanism. To switch the rails, the rail switching lock 78 is triggered to release the slide rod 761 form lock. The pressure acts on the gear wheel 72 and the crawler bearing 73 by the switching rail 41 pushes the entire primary power mechanism to slide. The primary power mechanism then pushes the spring 77 to compress. The switching power mechanism completes compression in the travel of the beveled segment of the switching rail 41. When the elevator car 1 moves to the bevel at the other end of the switching rail 41, the pressure applied to the switching power mechanism by the rail gradually reduces, so the primary power mechanism pushes the spring 77 to extend, thereby pushing the primary power mechanism to return to its original position.

Figure 11:
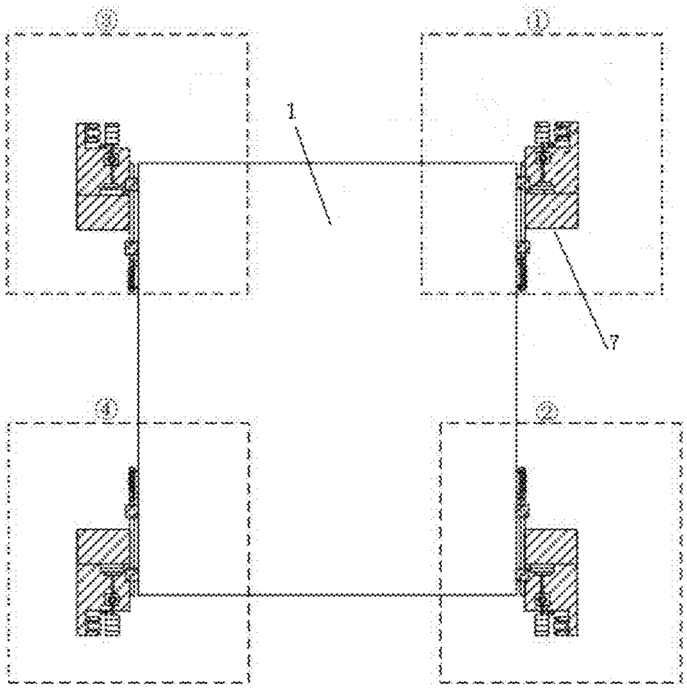
FIG. 11 is a schematic structural drawing of the elevator car according to the present invention.
Figure 12:
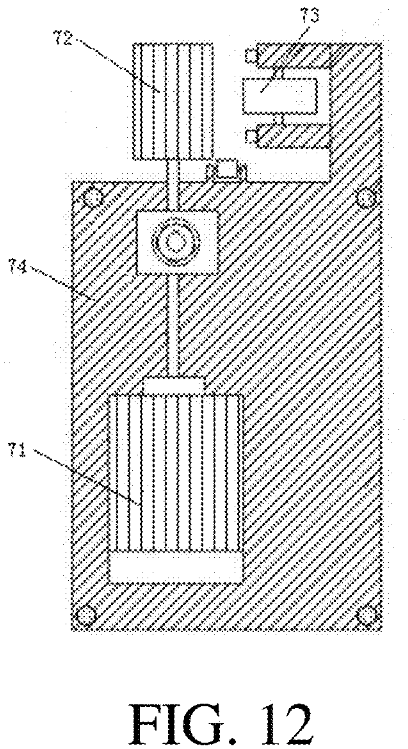
FIG. 12 is a schematic structural drawing of the primary power mechanism according to the present invention.
Figure 13:
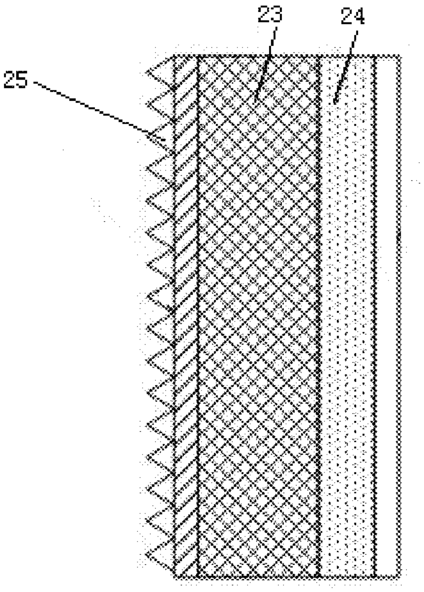
FIG. 13 is a structural top view of the rack rail according to the present invention.
Figure 14:
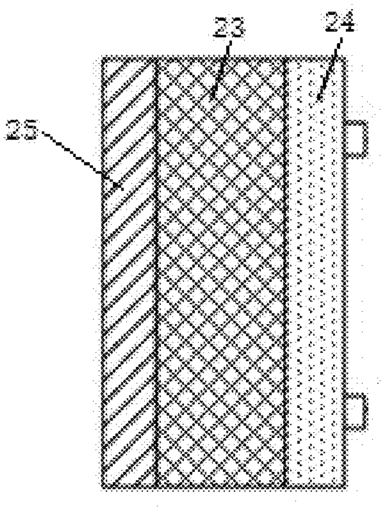
FIG. 14 is a top schematic structural drawing according to FIG. 13.

In the present embodiment, as shown in FIG. 11, there are four power mechanisms 7, symmetrically mounted on two opposite sides of the elevator car 1, respectively. Each of the primary power mechanisms has one acceleration sensor, for monitoring vibration of the gear wheel 72 in a real-time manner, so as to have a sight one the operational states of various components of the elevator and timely detect and locate abnormality of the rails and the primary power mechanisms of the elevator cars 1, thereby providing instant service and repair and ensuring safety of the elevator system. In the four power mechanisms 7, #1 power mechanism 7 has its controller connected to the anode of the power source; #2 power mechanism 7 has its controller connected to the cathode of the power source; #3 power mechanism 7 has its controller connected to the anode of the signal wire; and #4 power mechanism 7 has its controller connected to the cathode of the signal wire.

Figure 18:
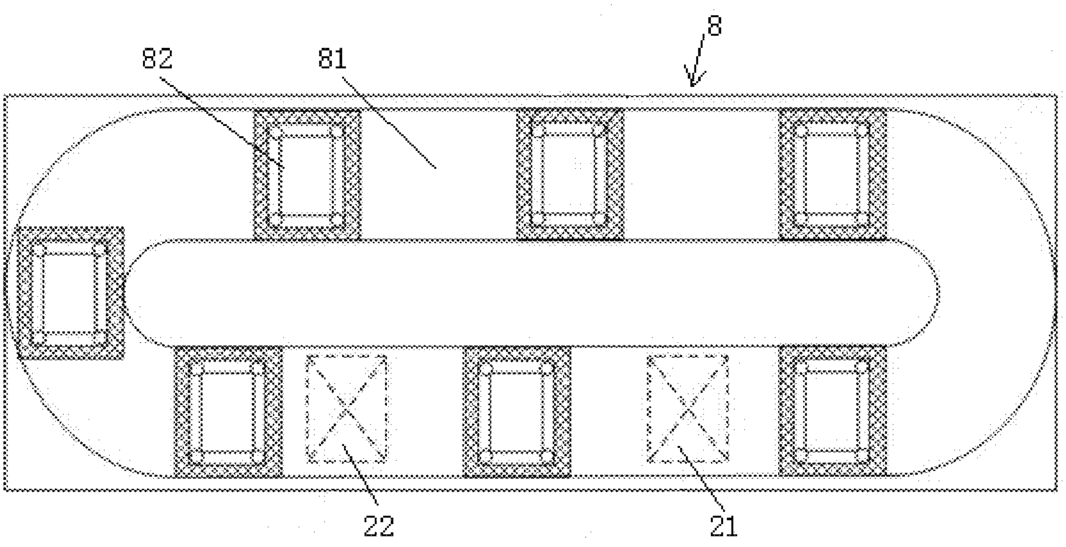
FIG. 18 is a schematic structural drawing of a top-floor rail according to the present invention.

As shown in FIG. 18, in the present embodiment, the system further comprises a top-floor rail mechanism 8. The top-floor rail mechanism 8 is located on the top floor of the building. The top-floor rail mechanism 8 comprises an elliptic, closed top-floor rail 81 and a plurality of top-floor carts 82. The top-floor rail 81 is linked to the upward shaft 11 and the downward shaft 12. The top-floor cart 82 is configured to slide on the top-floor rail 81. The elevator cars 1 are transported between the hoistways 9 by the top-floor carts 82. When the upward-going elevator car 1 arrives at the top floor through the upward shaft 11, the top-floor cart 82 transfers the elevator car 1 to the downward shaft 12, thereby enabling cycling operation of the elevator cars 1.

The disclosed system further comprises a smart control system. The smart control system comprises a weight detecting module, a sensing module, a processing module and a safety module. The weight detecting module is mounted on the elevator cars 1, for recording weights of the elevator cars 1 on each said floor in each time window, or the passenger flow, and providing recorded data to the processing module for storage and for development of a database. The sensing module detects the running speeds and temperatures of the elevator cars, and sends the detected data to the processing module. The processing module identifies peak hours and intensively accessed floors according to the data in the database, and allocates a number of said elevator cars 1 to be dispatched accordingly, thereby improving transportation efficiency. When determining that the system has a breakdown, the processing module signals the safety module to reduce the number of elevator cars 1 released.

The processing module controls the elevator cars 1 and various rails to perform self-testing at night or daybreak, in which the elevator cars 1 in the no-load state run a full cycle along the rails. It is important to ensure that every elevator car 1 has run through every rail, and every component of the entire system operates at least once. The sensors of the sensing module perform detection to handle the operation of the elevator. In the event of any abnormality is found in the system, the problematic component is located and fixed. As discussed herein, parallel operation of the elevator cars 1 includes parallelism between the upward and downward rails and the upward and downward passenger access rails, as hoistway as parallelism between the units and up-going/down-going parallelism. The elevator cars 1 run on the upward/downward operation rails. When a passenger pushes calls the elevator by pressing a button for this purpose, an elevator car 1 enters upward/downward passenger access rail to pick up the passenger, while the elevator cars 1 running on the upward/downward operation rails work as normal. Stop of an elevator car 1 at a certain unit for allowing passenger access does not influence the elevator cars 1 running in the other units. The upward operation rail and the downward operation rail are independent of each other. When every elevator car 1 moves upward, the elevator cars 1 in the downward operation rail at the opposite side are not affected.

In the event of failure of some rail, the elevator system enters its safe mode. At this time, the safety module reduces the number of the elevator cars 1 released; introduces the switching rail 41 near the problematic site or other backup switching rails 41; opens the backup access; and redirects the elevator cars 1 to bypass the problematic and enter other rails, thereby keeping the elevator system working.

A two-shaft multi-car parallel elevator system according to the present invention may have an operation track as shown in FIG. 1. There are a plurality of elevator cars 1 running simultaneously in the two hoistways 9.

Upward running: when an elevator car 1 carries passengers to move upward in the upward shaft 11 from Floor 1, the elevator car 1 ahead stops on Floor 4 for passenger access. When that elevator car 1 arrives at Floor 3, the switching rail 41 extends to connect the upward shaft 11 and the downward shaft 12, so the elevator car 1 enters the downward shaft 12. Then the switching rail 41 on Floor 3 retracts, and the elevator car 1 moves upward in the downward shaft 12. The switching rail 41 on Floor 6 extends to allow the elevator car 1 returns to the upward shaft 11 along the switching rail 41 and take the passengers to the designated floors. If another elevator car becomes in the way of the foregoing path, the elevator car 1 can similarly switch to the downward shaft 12 through the switching rail 41 to bypass the obstructive. After all the passengers are sent to their designated floors, the elevator car 1 moves upward to enter the top-floor rail 81. The rack of the top-floor cart 82 interconnects the operation rail in the upward shaft 11. The elevator car 1 drives into the top-floor cart 82. The top-floor cart 82 drives along the top-floor rail 81 to transport the elevator car 1 to the downward shaft 12.

Downward running: when an elevator car 1 carrying passengers moves downward in the downward shaft 12 from Floor 50, the elevator car 1 ahead stops on Floor 46 for passenger access. Thus, when that elevator car 1 arrives at Floor 47, the switching rail 41 extends to connect the upward shaft 11 and the downward shaft 12. The elevator car 1 enters the upward shaft 11. Then the switching rail 41 on Floor 47 retracts. The elevator car 1 moves downward in the upward shaft 11. The switching rail 41 on Floor 44 extends to allow the elevator car 1 to return to the downward shaft 12 along the switching rail 41 and take the passengers to their designated floors. If another elevator car becomes in the way of the foregoing path, the elevator car 1 can similarly switch to the upward shaft 11 through the switching rail 41 to bypass the obstructive. The elevator car 1 keeps moving downward to take the passengers to Floor 1 or the underground garage. When the elevator car 1 is empty, it continuously moves downward to the bottom-floor service mechanism 6. The elevator car 1 at the entrance of the downward shaft 12 is transported to the upward shaft 11 by the transfer cart 51 along the circular rail 61, and then moves upward to Floor 1. Afterward, the elevator car 1 picks up passengers at the elevator gateway before moving upward to complete one cycle of this elevator car 1. The number of the elevator cars 1 may vary depending on practical needs. The elevator cars 1 operate independently in a cycling manner without interfering each other. A broken elevator car 1 is transported to the service rail 62 for repair and maintenance without interfering normal operation of the other elevator cars 1.

Embodiment 2

Figure 3:
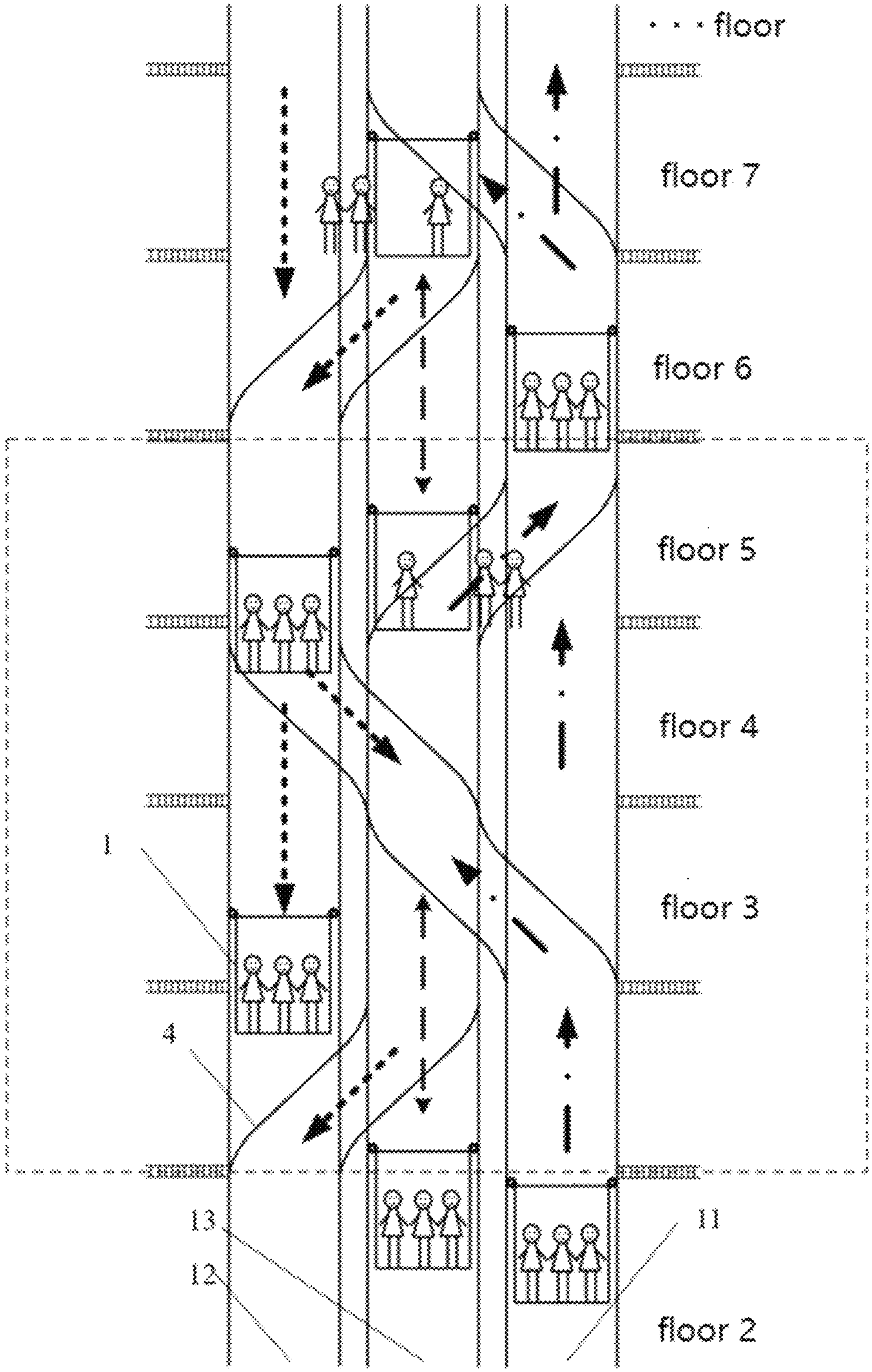
FIG. 3 is a track graph of a three-shaft elevator system according to Embodiment 2 of the present invention.
Figure 4:
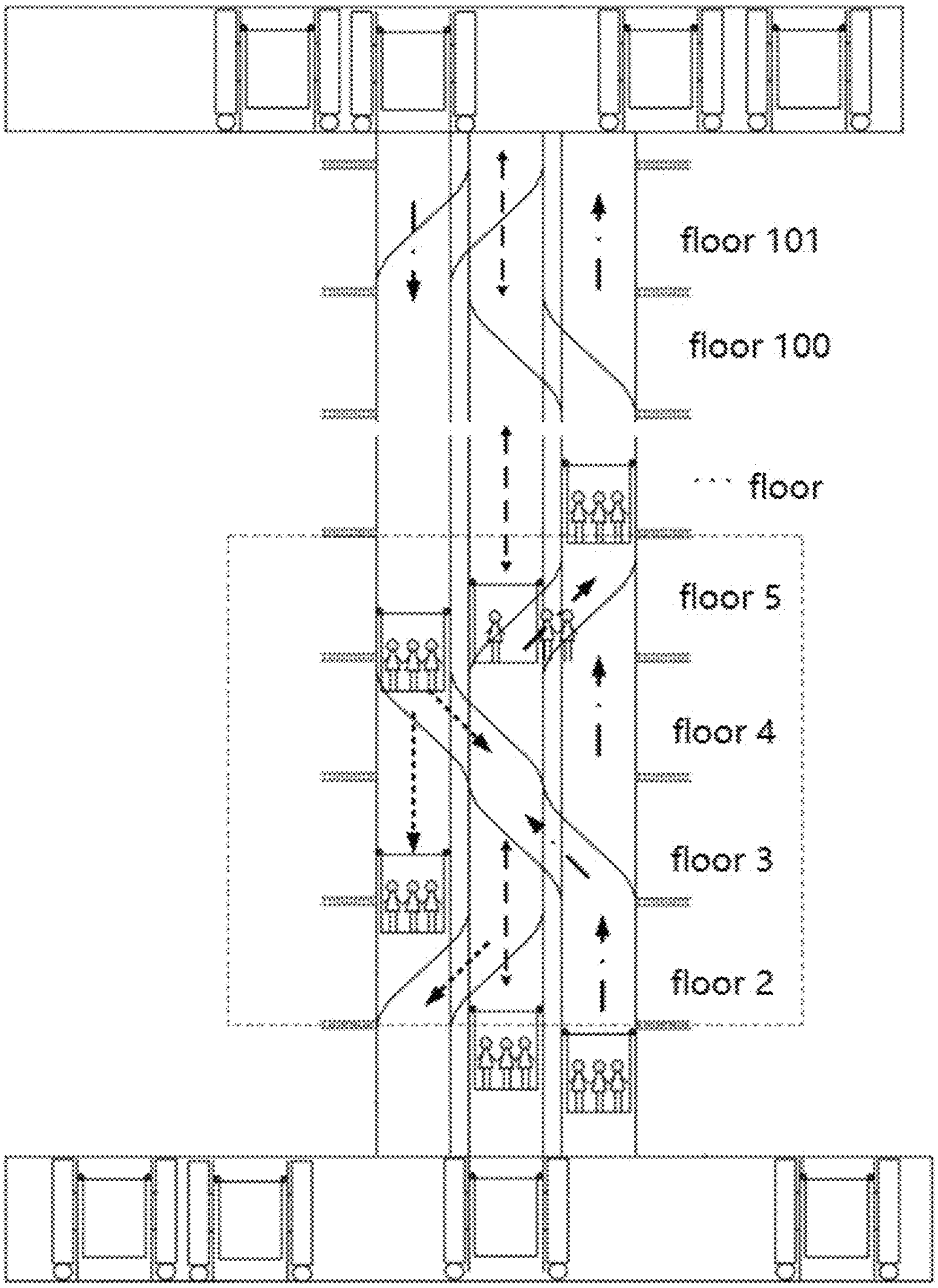
FIG. 4 is a schematic structural drawing of the three-shaft elevator system of the present invention.

FIG. 3 and FIG. 4 show a second mode of the smart multi-car elevator system of the present invention. The present embodiment is different from Embodiment 1 for having three hoistways 9.

In the present embodiment, there are three hoistways 9, including an upward shaft 11, a downward shaft 12 and an auxiliary shaft 13. The auxiliary shaft 13 is located between the upward shaft 11 and the downward shaft 12. A switching mechanism 4 is provided between two adjacent hoistways 9. The elevator car 1 is switched between the upward shaft 11 and the auxiliary shaft 13 or between the downward shaft 12 and the auxiliary shaft 13 by the switching mechanism 4.

In the present embodiment, when all the switching rails 41 are connected to the operation rail, all the switching rails 41 form a continuous "S" shape and the adjacent switching rails 41 are connected in a head-to-tail manner.

In the present embodiment, when the elevator cars 1 need to bypass obstructive when moving upward or downward, the upward or downward going elevator cars 1 may be switched to the auxiliary shaft 13 through the switching rail 41.

Embodiment 3

Figure 5:
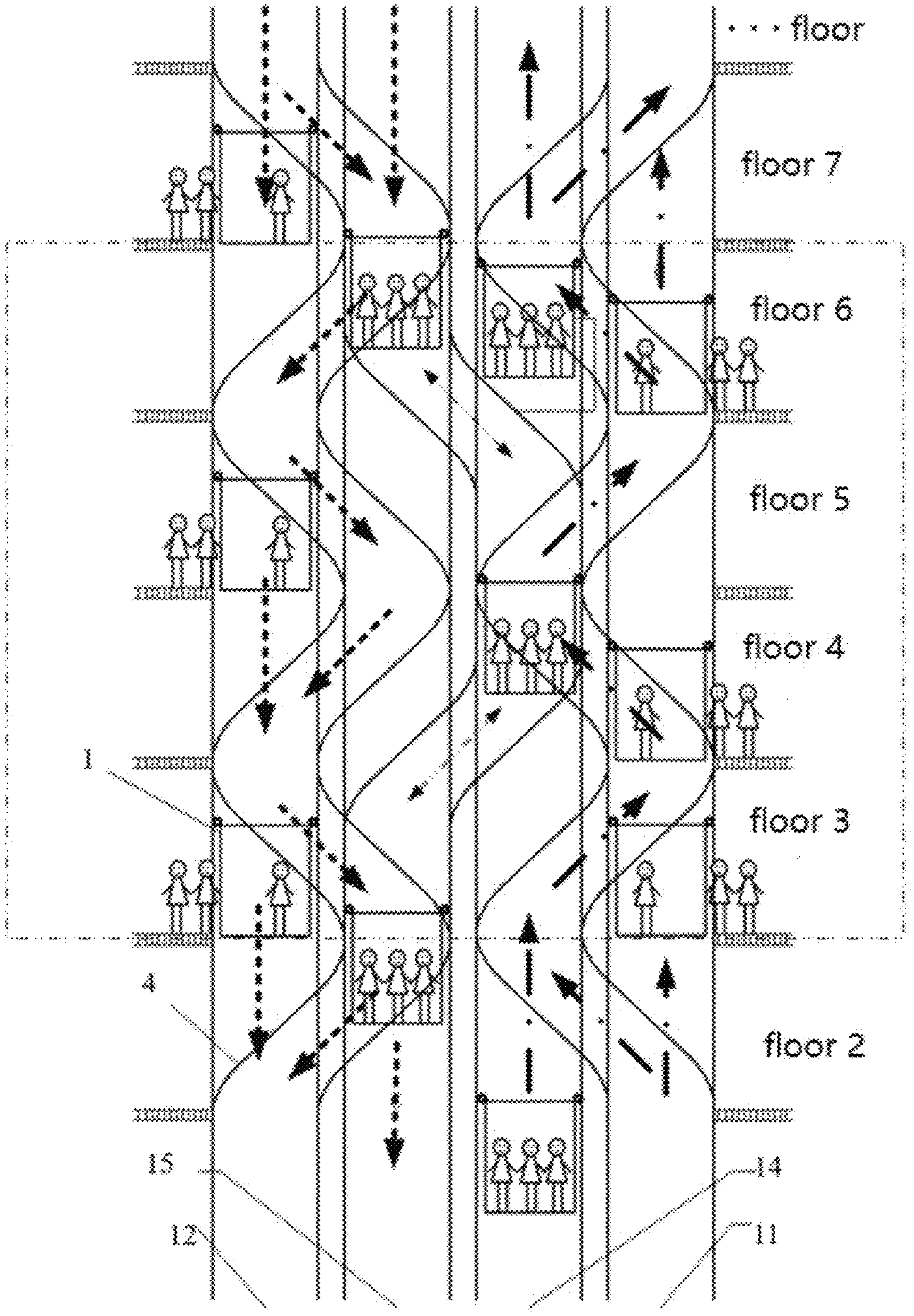
FIG. 5 is a track graph of a four-shaft elevator system according to Embodiment 3 of the present invention.
Figure 6:
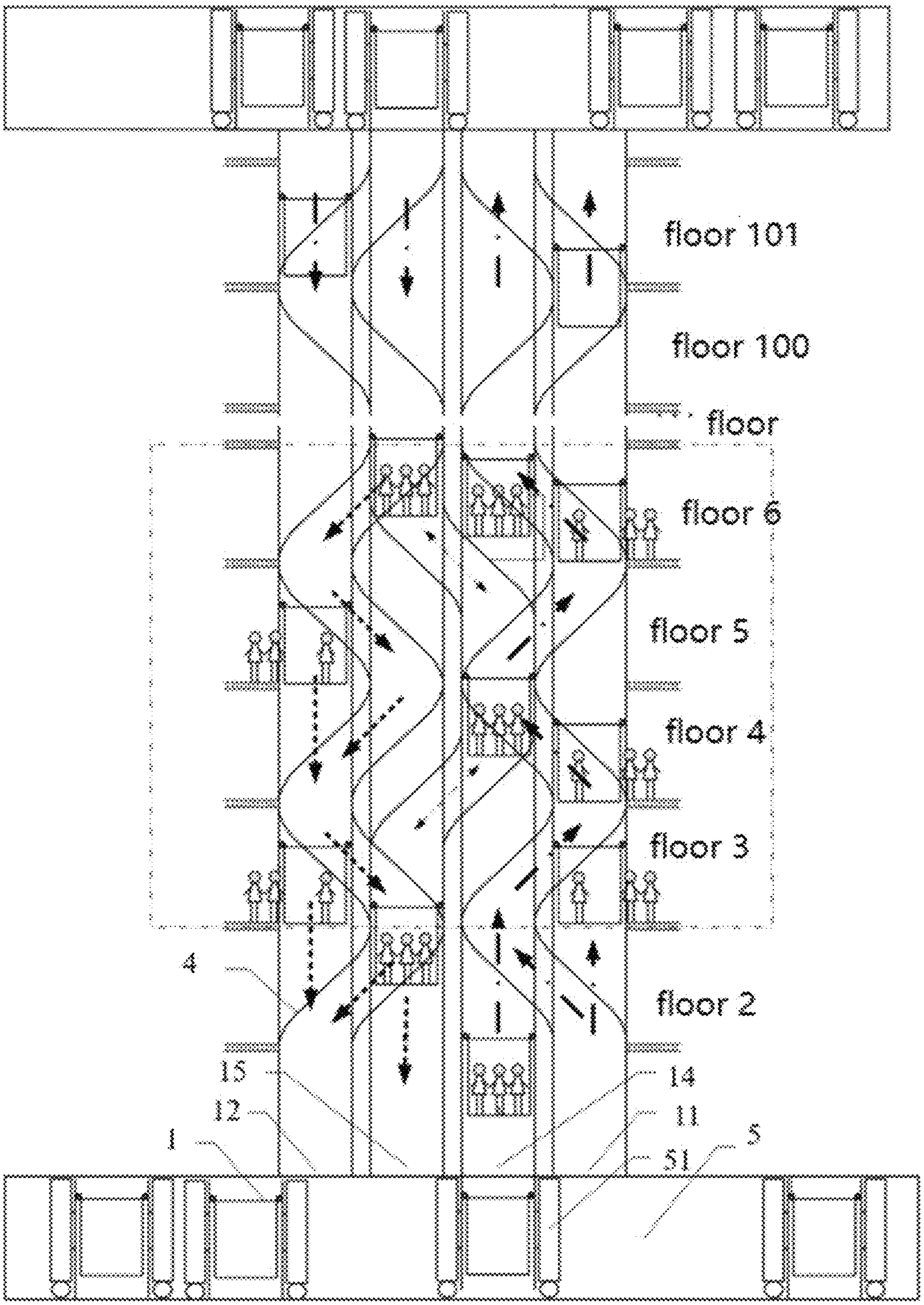
FIG. 6 is a schematic structural drawing of the four-shaft elevator system of the present invention.

FIG. 5 and FIG. 6 show a third mode of the smart multi-car elevator system of the present invention. The present embodiment is different from Embodiment 1 for having four hoistways 9.

In the present embodiment, there are four hoistways 9, including in sequence an upward shaft 11, an auxiliary upward shaft 14, an auxiliary downward shaft 15 and a downward shaft 12. A switching mechanism 4 is provided between two adjacent hoistways 9. The elevator car 1 is switched between the upward shaft 11 and the auxiliary upward shaft 14, between the downward shaft 12 and the auxiliary downward shaft 15 or between the auxiliary upward shaft 14 and the auxiliary downward shaft 15 through the switching mechanism 4.

In the present embodiment, the switching mechanisms 4 in the adjacent hoistways 9 are connected in a head-to-tail manner.

In the present embodiment, when an upward moving elevator car 1 needs to bypass obstructive, it can be switched to the auxiliary upward shaft 14 through the switching rail 41. When a downward moving elevator car 1 needs to bypass obstructive, it can be switched to the auxiliary downward shaft 15 through the switching rail 41. Connection between the auxiliary upward shaft 14 and the auxiliary downward shaft 15 is only established in the event of extreme congestion or when any one of the auxiliary upward shaft 14 and the auxiliary downward shaft 15 has a broken elevator car 1.

Embodiment 4

Figure 7:
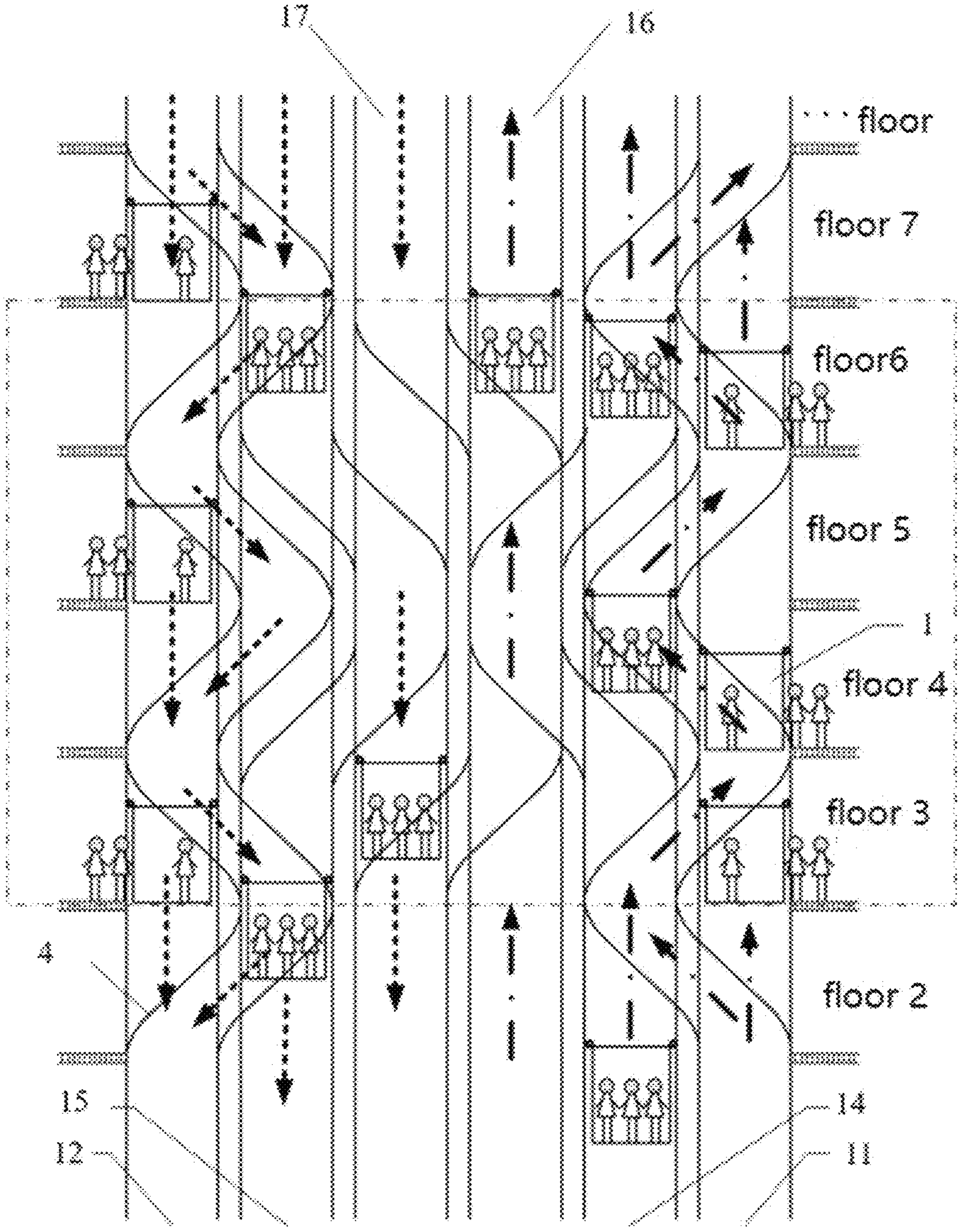
FIG. 7 is a track graph of a six-shaft elevator system according to Embodiment 4 of the present invention.
Figure 8:
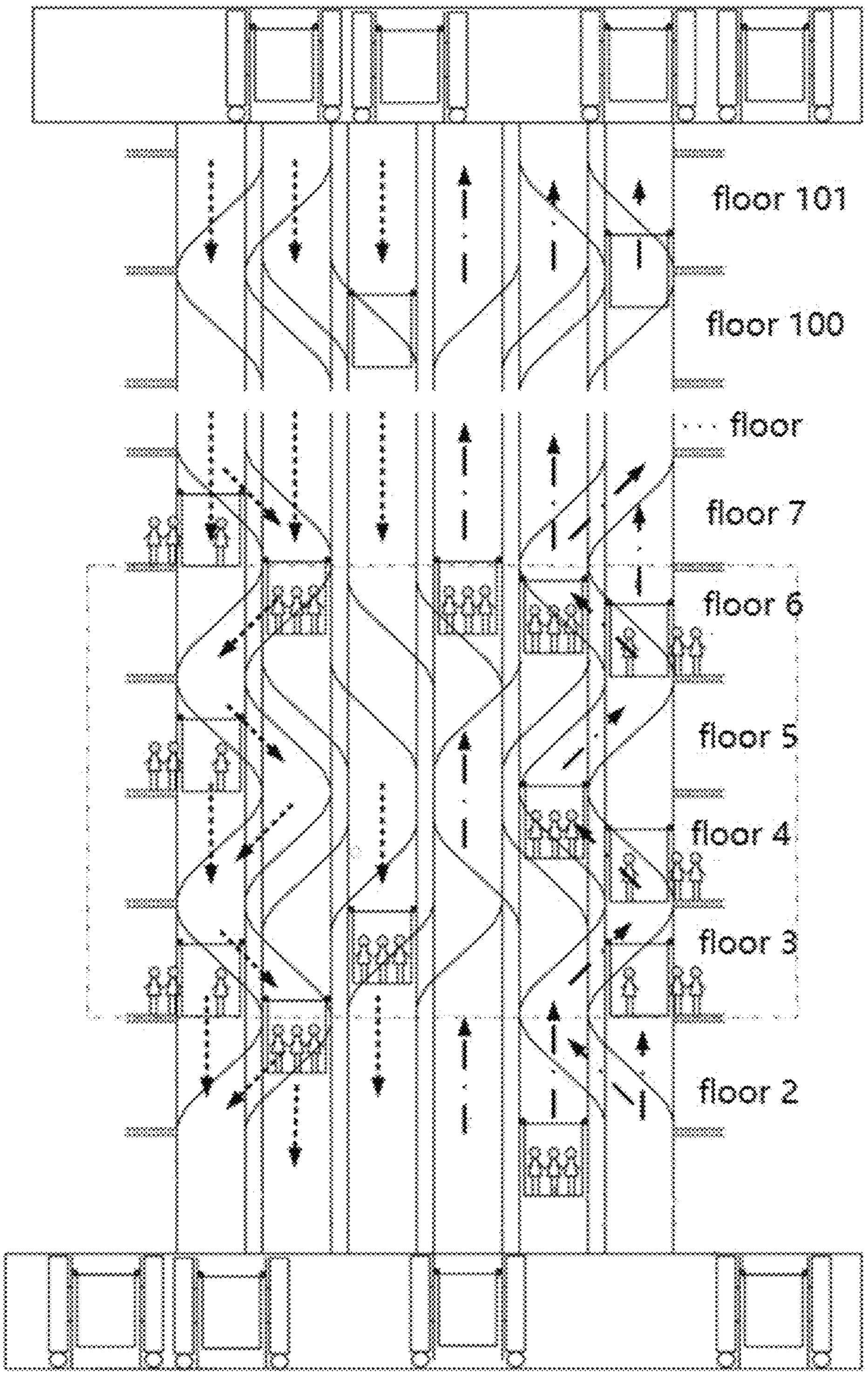
FIG. 8 is a schematic structural drawing of the six-shaft elevator system of the present invention.
Figure 9:
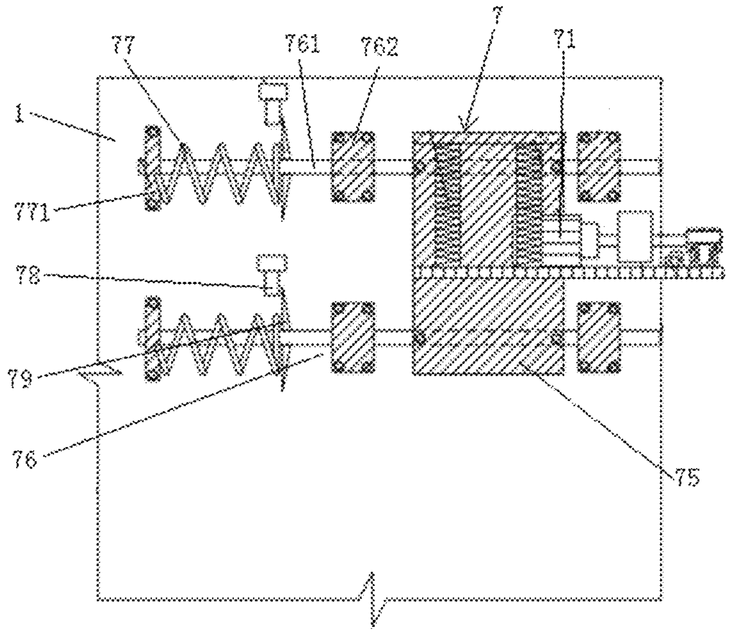
FIG. 9 is a schematic structural drawing of the power mechanism according to the present invention.
Figure 10:
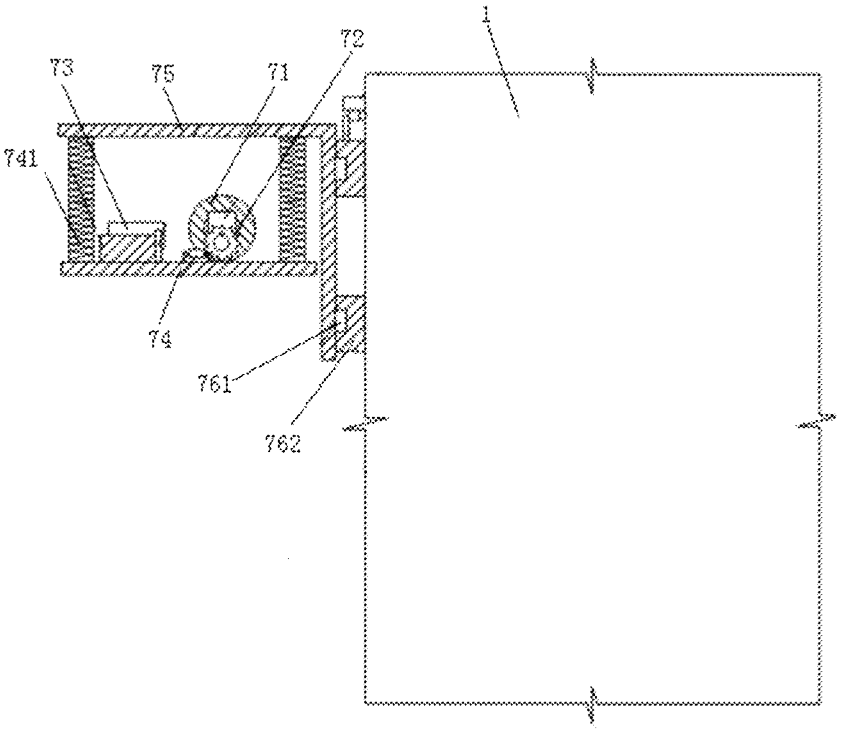
FIG. 10 is a lateral schematic structural drawing according to FIG. 9 of the present invention.

FIG. 7 and FIG. 8 show a fourth mode of the smart multi-car elevator system of the present invention. The present embodiment is different from Embodiment 1 for having six hoistways 9.

In the present embodiment, there are six hoistways 9, including in sequence an upward shaft 11, an auxiliary upward shaft 14, an upward fast shaft 16, a downward fast shaft 17, an auxiliary downward shaft 15 and a downward shaft 12. A switching mechanism 4 is provided between two adjacent hoistways 9. The elevator car 1 is switched between adjacent hoistways 9 by the switching mechanism 4.

In the present embodiment, the switching mechanisms 4 in the adjacent hoistways 9 are connected in a head-to-tail manner.

In the present embodiment, when an upward moving elevator car 1 needs to bypass obstructive, the upward moving elevator car 1 can be switched to the auxiliary upward shaft 14 through the switching rail 41. When a downward moving elevator car 1 needs to bypass obstructive, the downward moving elevator car 1 can be switched to the auxiliary downward shaft 15 through the switching rail 41. If there is any passenger wants to go up form Floor 1 to the top floor or from the top floor go downward to Floor 1, the elevator car 1 can be switched to the upward fast shaft 16 or the downward fast shaft 17 for moving upward or downward. Connection between the upward fast shaft 16 and the downward fast shaft 17 is only established in the event of extreme congestion or when any one of the upward fast shaft 16 and the downward fast shaft 17 have a broken elevator car 1.

Embodiment 5

Figure 21:
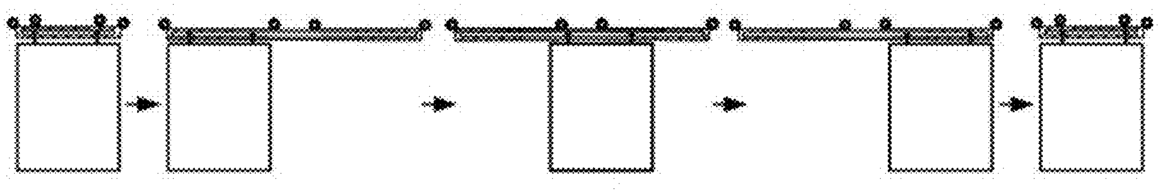
FIG. 21 is schematic drawing depicting elevator cars switched according to Embodiment 5 of the present invention.
Figure 22:
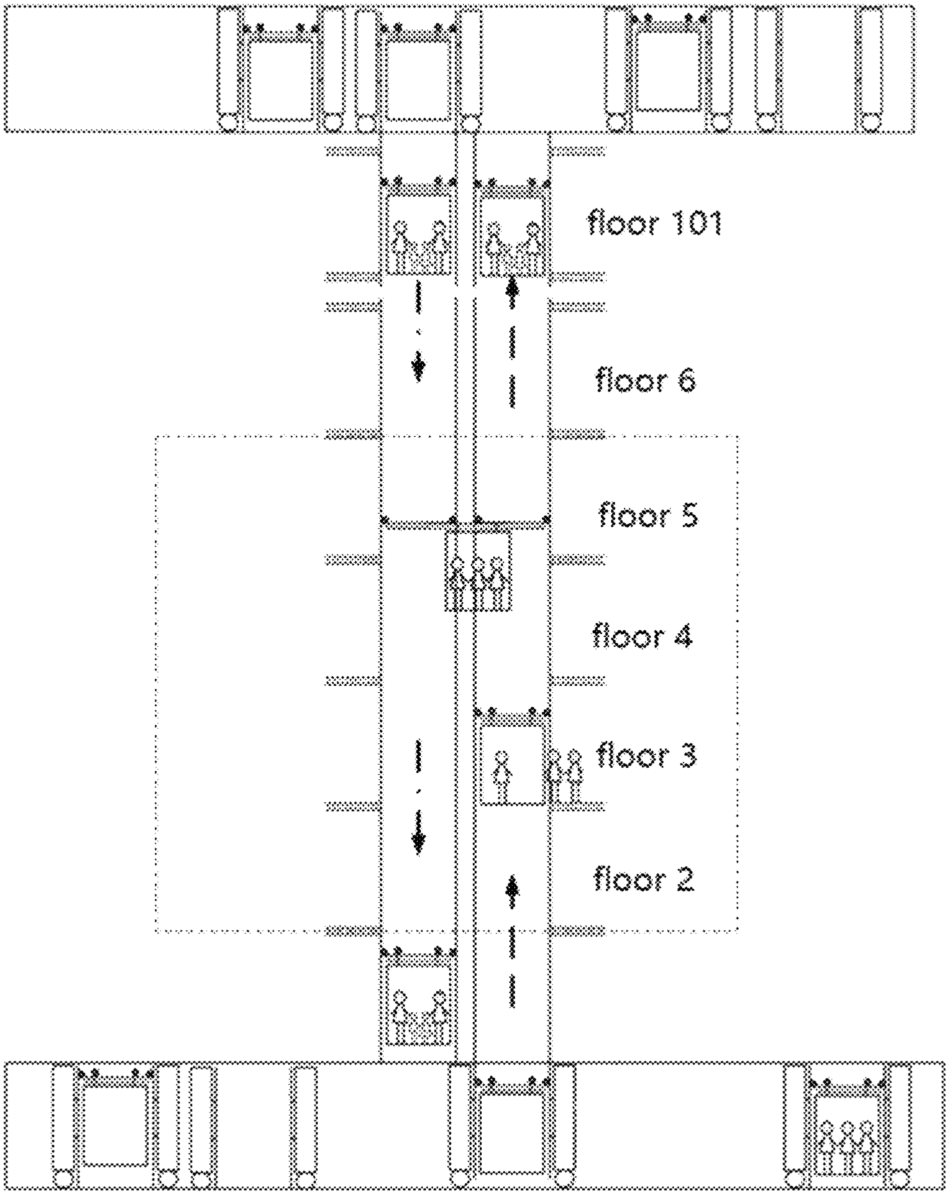
FIG. 22 is a schematic drawing of a two-shaft elevator system according to Embodiment 5 of the present invention.
Figure 23A:
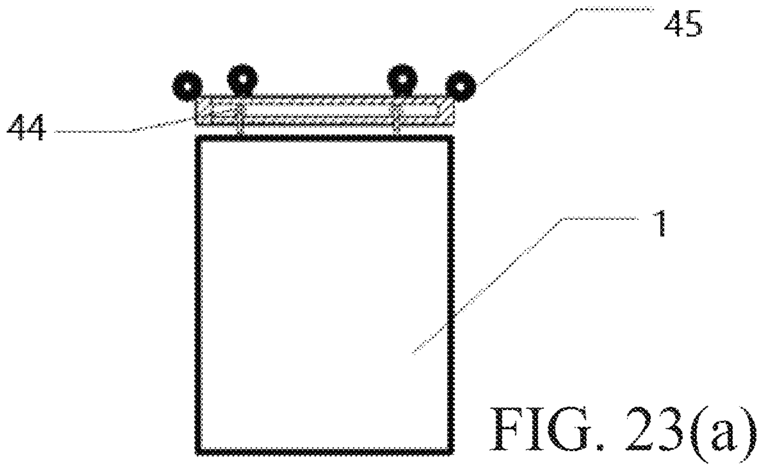
FIG. 23(*a*) is a schematic drawing of Embodiment 5 of the present invention showing a switching process.
Figure 23B:
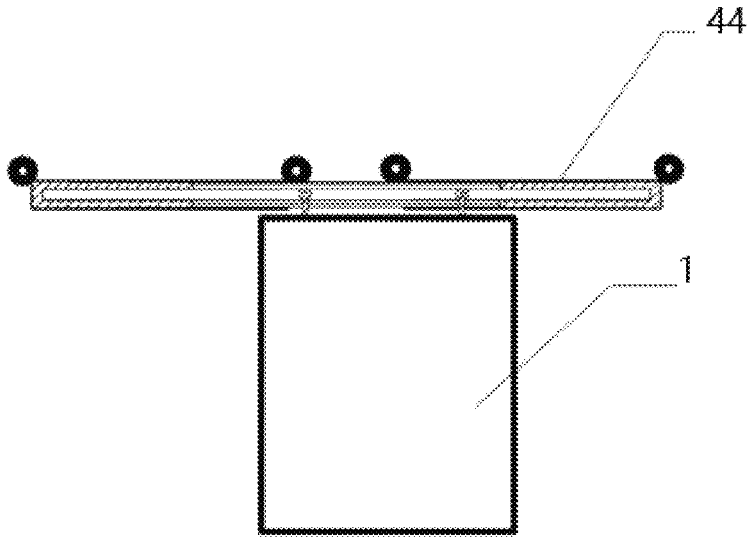

FIG. 21 through FIG. 23 shows a fifth mode of the smart multi-car elevator system of the present invention. The present embodiment is different from Embodiment 1 for the structure of its switching mechanism 4.

Every elevator car 1 has four power units, one extendable slideway 44 and a pulley 45. The elevator car 1 is fixed to the slideway 44 through the pulley 45 and is allowed to slide right or left. The slideway 44 is extendable to enable switching between different rails. The four power units are divided into two groups, one is meshed with the original rail for providing lifting power, and the other is used during rail switching to get meshed with the target rail. Power is cut during the meshing operation and reassumed after the meshing operation to power the elevator car 1. At this time, the original power units stop supplying power and the original rail is released. Afterward, the slideway 44 is retracted to complete the rail switching process.

Embodiment 6

FIG. 24 through FIG. 27 shows a sixth mode of the smart multi-car elevator of the present invention. The smart multi-car elevator system of the present embodiment comprises a primary rail mechanism 2, a secondary rail mechanism 3, a switching mechanism 4, a transfer mechanism 5, a bottom-floor service mechanism 6, a power mechanism 7 and a plurality of elevator cars 1. The switching mechanism 4 links the primary rail mechanism 2 and the secondary rail mechanism 3. The elevator car 1 is switched between the primary rail mechanism 2 and the secondary rail mechanism 3 through the switching mechanism 4. The transfer mechanism 5 is located on a first floor among the floors that is immediately on the ground. The elevator cars 1 when driven by the transfer mechanism 5 move between elevator entrances on the first floor. The bottom-floor service mechanism 6 is installed in a basement under the ground. The bottom-floor service mechanism 6 is located at the bottoms of the primary rail mechanism 2 and the secondary rail mechanism 3. The bottom-floor service mechanism 6 is connected to every elevator entrance on the first floor. The elevator car 1 when driven by the power mechanism 7 performs lifting or lowering movement or switching movement. During operation, the plural elevator cars 1 move upward or downward simultaneously in the primary rail mechanism 2. Every elevator car 1 is switched to secondary rail mechanism 3 from the primary rail mechanism 2 through switching mechanism 4, respectively, from for allowing passenger access.

In the present embodiment, all the rails are arranged in pairs.

In the present embodiment, the primary rail mechanism 2 and the secondary rail mechanism 3 are divided into n units according to a number of the floors. The number of floors covered by every unit is determined according to practical needs. Every unit has its upper end and lower end each provided with a switching mechanism 4. The switching rails 41 at the upper end and the lower end are arranged symmetrically.

In the present embodiment, the primary rail mechanism 2 comprises an upward primary rail 21 and a downward primary rail 22. The secondary rail mechanism 3 comprises an upward secondary rail 31 and a downward secondary rail 32. The upward secondary rail 31 and the downward secondary rail 32 are located between the upward primary rail 21 and the downward primary rail 22. The floor is located between the upward secondary rail 31 and the downward secondary rail 32. The plural elevator cars 1 can move on the upward primary rail 21 and the downward primary rail 22 simultaneously.

In the present embodiment, the switching mechanism 4 comprises a plurality of switching rails 41 and switching drivers 42. The switching rail 41 is curved in shape and has two beveled ends. The switching rails 41 are arranged alternately and in pairs along the switching rail 41 in the upward or downward the direction of the elevator car 1. Between the switching rails 41 of the same pair, one is located at the center of the upward primary rail 21 or at the center of the downward primary rail 22, and the other is located at the center of the upward secondary rail 31 or at the center of the downward secondary rail 32. Every switching rail 41 has one switching driver 42. The switching rail 41 is centrally hinged to shaft through a hinge. The switching driver 42 is a hydraulic jack. As shown in FIG. 16(*a*) and FIG. 16(*b*), the switching rail 41 is driven to rotate by the hydraulic jack. When extend, it is connected to the primary rail mechanism 2 and the secondary rail mechanism 3, and when retracted, it becomes away from the primary rail mechanism 2 and the secondary rail mechanism 3, and vertically fixed in the shaft of the primary rail mechanism 2 or the secondary rail mechanism 3.

In the present embodiment, the upward primary rail 21, the downward primary rail 22, the upward secondary rail 31, the downward secondary rail 32 and the switching rail 41 are all rack rails. The rack rail is composed of a steel frame 23, a fixing groove 24 and a rack 25. The steel frame 23 has its one side provided with the rack 25, and the other side provided with the fixing groove 24. The rack and the power mechanism 7 are engaged with each other. The fixing groove 24 and the power mechanism 7 are meshed with each other. The power supply and signal rails for the elevator are installed at the side having the fixing groove 24. Every rack rail has two power/signal wire rails that are connected to the power mechanism 7, respectively.

As shown in FIG. 17(*a*) through FIG. 17(*c*), for switching the elevator car 1 to the secondary rail mechanism 3 from the primary rail mechanism 2, the power mechanism 7 receives the control signal and directs the hydraulic jack to work on the switching pivot of the switching rail 41, so the switching rail 41 is pushed to extend and connects the primary rail mechanism 2 and the secondary rail mechanism 3. After the elevator car 1 enters the secondary rail mechanism 3, the hydraulic jack gradually reduces the pushing force it applies to the switching rail 41 to allow the switching rail 41 to retract. Afterward, the primary rail mechanism 2 and the secondary rail mechanism 3 return to normal operation.

In the present embodiment, the transfer mechanism 5 comprises transfer carts 51 and transfer rails 52, and the first floor has a plurality of elevator entrances. The elevator entrances are arranged into two rows. Every elevator entrance is provided with a transfer cart 51. The primary rail mechanism 2 is linked to the center of the transfer rail 52. The transfer cart 51 moves on the transfer rail 52. Every transfer cart 51 is connected to the primary rail mechanism 2 through the transfer rail 52. The elevator cars 1 are transported to different elevator entrances through the transfer carts 51. The transfer cart 51 has its bottom provided with casters, allowing it to move in multiple directions. For changing direction, the elevator car 1 moves no turns but only shifts between two vertical rails of the transfer rails 52. To allow the elevator cars 1 to move upward, they are transported by the transfer carts 51 from the elevator gateways to the upward shaft 11 along the transfer rails 52. To allow the elevator cars 1 to move downward, they move along the downward shaft 12 to the first floor and then transported by the transfer carts 51 to different elevator gateways for passenger drop-off.

In the present embodiment, the bottom-floor service mechanism 6 comprises a circular rail 61 and a transfer cart 51. The primary rail mechanism 2 is connected to the center of the circular rail 61. After stopping at the first floor, the downward moving elevator car 1 continues to go downward from the first floor to the circular rail 61 at the basement. After arriving at the basement, the elevator car 1 is transported along the circular rail 61 to the circular rail 61 at the opposite side from the entrance of the rail by the transfer cart 51, and randomly dispatched to different upward shafts 11.

In the present embodiment, the bottom-floor service mechanism 6 further comprises two service rails 62, installed vertically at two sides of the circular rail 61. When the elevator car 1 is broken or needs services, it is transported to the corresponding service rail 62, so as not to interference normal operation of the other elevator cars 1.

In the present embodiment, the transfer rail 52, the circular rail 6 land the service rail 62 are all rack rails. The rack rail is composed of a steel frame 23, a fixing groove 24 and a rack 25. The steel frame 23 has its one side provided with the rack 25, and the other side provided with the fixing groove 24. The rack 25 and the power mechanism 7 are engaged with each other. The fixing groove 24 and the power mechanism 7 are meshed with each other.

In the present embodiment, the power mechanism 7 comprises a primary power mechanism and a switching power mechanism. The primary power mechanism comprises a motor 71, a gear wheel 72, a crawler bearing 73, a support plate 74 and a mount 75. The mount 75 is an L-shaped steel plate. The support plate 74 is mounted on one side of the mount 75. A shock absorber 741 is provided between the support plate 74 and the mount 75. The motor 71 and crawler bearing 73 are mounted on the support plate 74. The gear wheel 72 is driven by the motor 71. The gear wheel 72 and the rack 25 are engaged with each other. The crawler bearing 73 and the fixing groove 24 are meshed with each other. A stabilizer bearing is installed on one side of the drive shaft of the gear wheel 72 for ensuring stable operation. Controllers are installed on two ends of the support plate 74 near the crawler bearing 73 for receiving power and signals.

The switching power mechanism comprises a roller guide 76, a spring 77 and a restrainer. The mount 75 has the other side fixed to the slide rod 761 of the roller guide 76. The slider 762 of the roller guide 76 is fixed to the elevator car 1. The slide rod 761 is slidably mounted in the slider 762. The spring 77 has its one end fixed to the elevator car 1 through a spring retaining plate 771, and has the other end fixedly connected to the restrainer. The restrainer is connected to the slide rod 761. The restrainer controls the slide rod 761 to slide or stop, thereby ensuring safe switching.

In the present embodiment, the restrainer comprises a rail switching lock 78 and a push chunk 79. The rail switching lock 78 is mounted on the elevator car 1. The push chunk 79 is fixed to the slide rod 761. The spring 77 has the other end fixed to the push chunk 79. The rail switching lock 78 is located on the side of the push chunk 79 that is connected to the spring 77. The rail switching lock 78 prevents the push chunk 79 from displacement.

There are two switching power mechanisms. The mount 75 is fixed to two slide rods 761. There are four sliders 762, two for each slide rod 761. The mount 75 is located between the two sliders 762. Movement of the slide rod 761 drives the primary power mechanism. To switch the rails, the rail switching lock 78 is triggered to release the slide rod 761 form lock. The pressure acts on the gear wheel 72 and the crawler bearing 73 by the switching rail 41 pushes the entire primary power mechanism to slide. The primary power mechanism then pushes the spring 77 to compress. The switching power mechanism completes compression in the travel of the beveled segment of the switching rail 41. When the elevator car 1 moves to the bevel at the other end of the switching rail 41, the pressure applied to the switching power mechanism by the rail gradually reduces, so the primary power mechanism pushes the spring 77 to extend, thereby pushing the primary power mechanism to return to its original position.

In the present embodiment, there are four power mechanisms 7, symmetrically mounted on two opposite sides of the elevator car 1, respectively. Each of the primary power mechanisms has one acceleration sensor, for monitoring vibration of the gear wheel 72 in a real-time manner, so as to have a sight one the operational states of various components of the elevator and timely detect and locate abnormality of the rails and the primary power mechanisms of the elevator cars 1, thereby providing instant service and repair and ensuring safety of the elevator system. In the four power mechanisms 7, #1 power mechanism 7 has its controller connected to the anode of the power source; #2 power mechanism 7 has its controller connected to the cathode of the power source; #3 power mechanism 7 has its controller connected to the anode of the signal wire; and #4 power mechanism 7 has its controller connected to the cathode of the signal wire.

In the present embodiment, the system further comprises a top-floor rail mechanism 8. The top-floor rail mechanism 8 is located on the top floor of the building. The top-floor rail mechanism 8 comprises an elliptic, closed top-floor rail 81 and a plurality of top-floor carts 82. The top-floor rail 81 is linked to the upward shaft 11 and the downward shaft 12. The top-floor cart 82 is configured to slide on the top-floor rail 81. The elevator cars 1 are transported between the hoistways 9 by the top-floor carts 82. When the upward-going elevator car 1 arrives at the top floor through the upward secondary rail 31, the top-floor cart 82 transfers the elevator car 1 to the downward secondary rail 32, thereby enabling cycling operation of the elevator cars 1.

Every unit covers four floors. The bottom unit begins from the second floor. Operation of the smart multi-car elevator of the present embodiment will be describe below with reference to an example involving passenger moving across Floor 1 through Floor 5.

Figure 24:
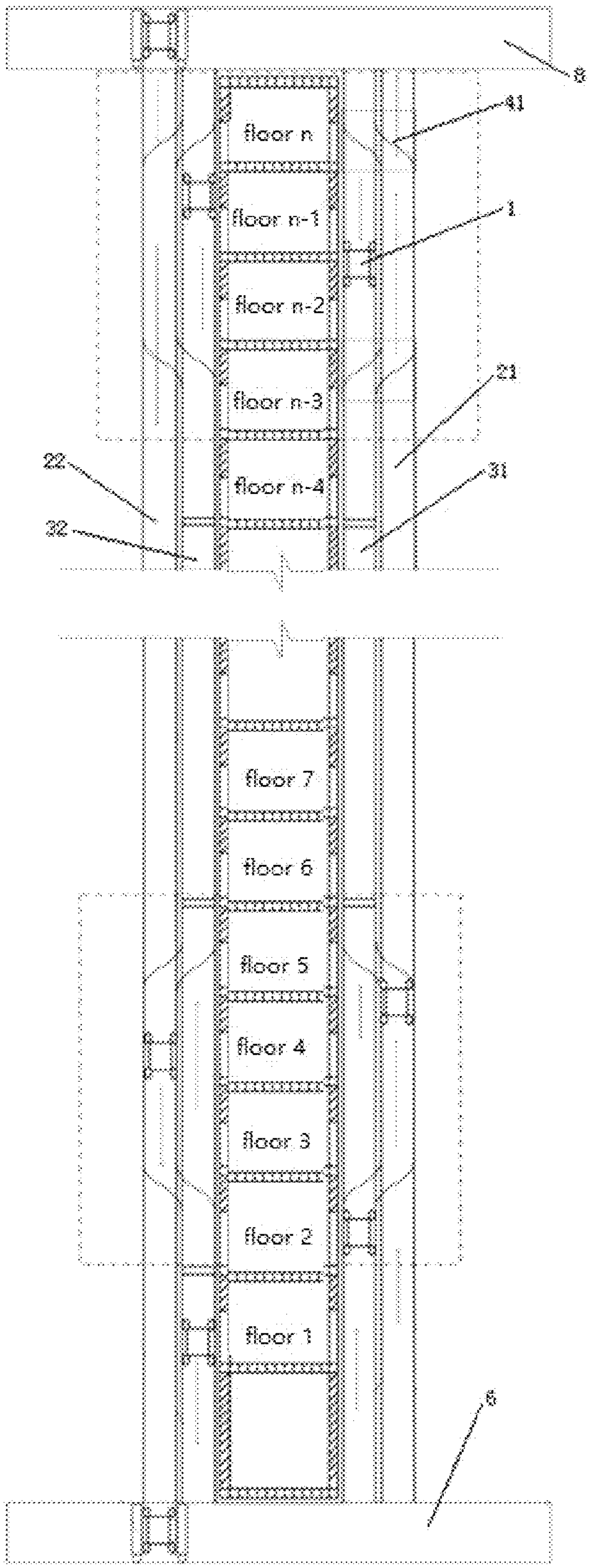
FIG. 24 is a schematic structural drawing of Embodiment 6 of the present invention.
Figure 25:
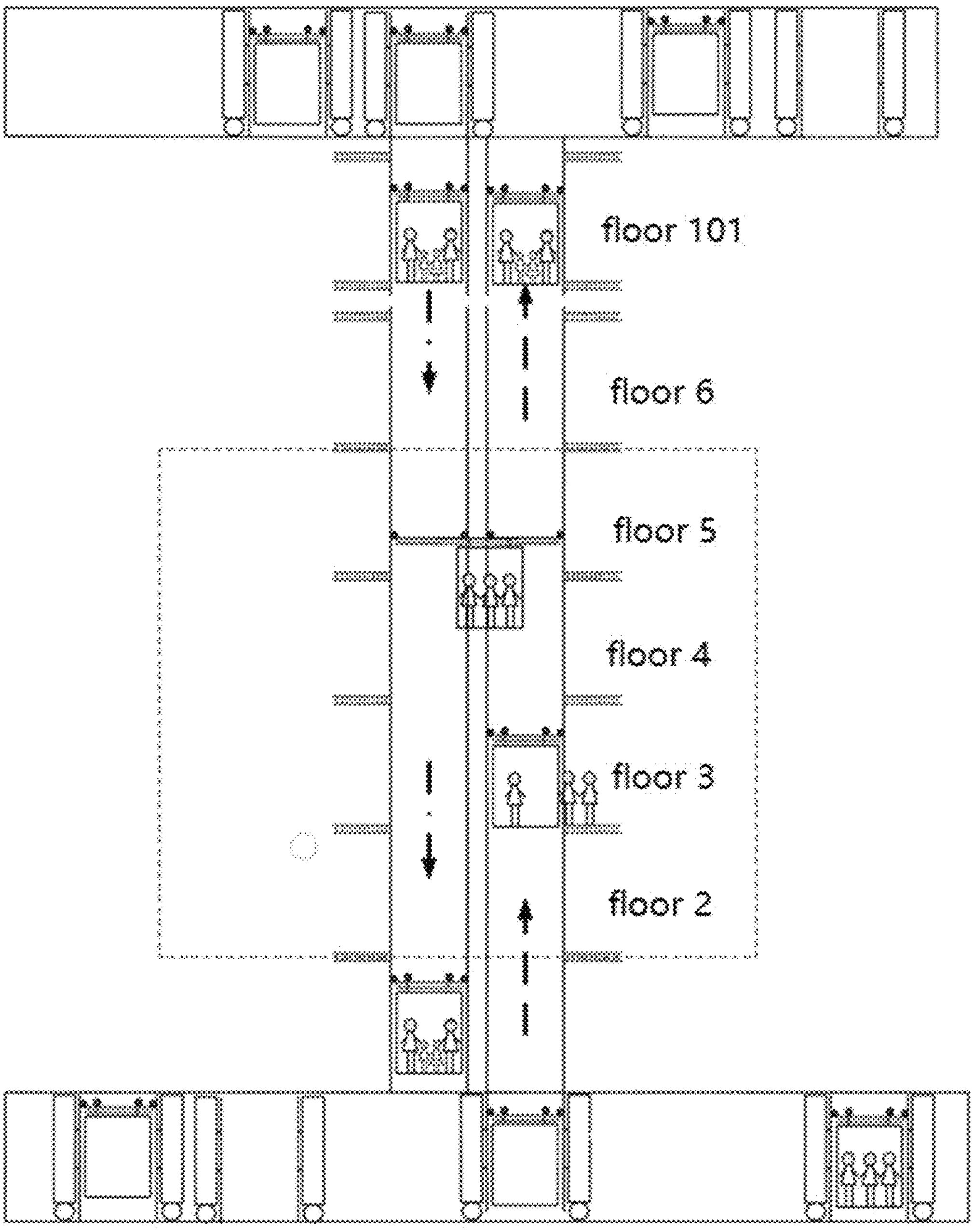
FIG. 25 is a local schematic structural drawing of Embodiment 6 of the present invention.
Figure 26:
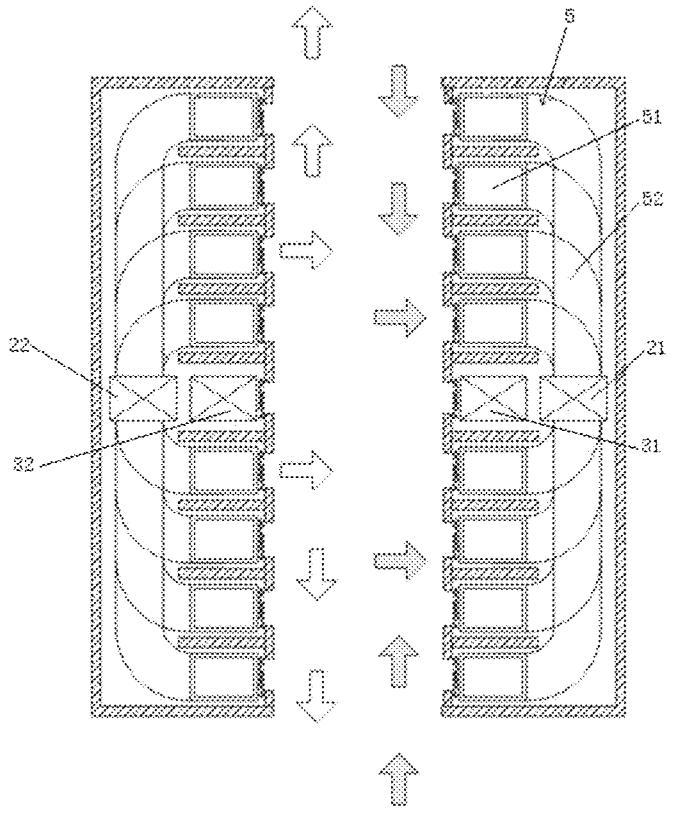
FIG. 26 is a schematic structural drawing of a transfer mechanism according to Embodiment 6 of the present invention.
Figure 27:
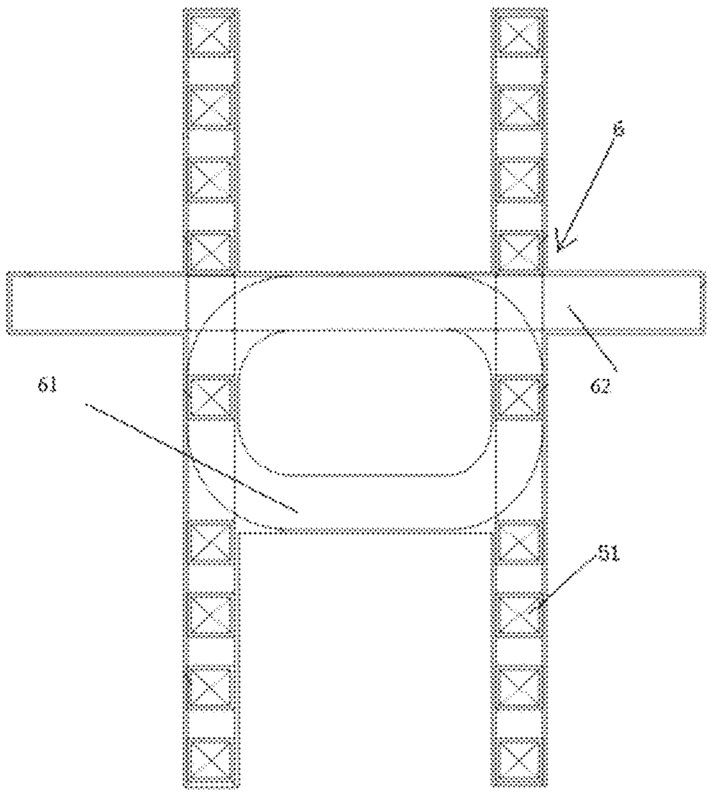
FIG. 27 is a schematic structural drawing of a bottom-floor service mechanism according to Embodiment 6 of the present invention.

When there is any passenger at Floor 1 who wants to move to any of Floor 2 through Floor 5, the elevator car 1 moves on the upward primary rail 21 to about Floor 7. At this time, the switching rail 41 extends to connect the upward primary rail 21 and the upward secondary rail 31. The elevator car 1 then enters the upward secondary rail 31, and stops floor by floor downward from Floor 5 for allowing passenger access. The switching rail 41 retracts. After the intended stop, the switching rail 41 on Floor 2 extends, and the elevator car 1 returns to the upward primary rail 21 to continue its upward-going route and arrive at the next unit for allowing passenger access, until it arrives at the topmost unit. As shown in FIG. 24, after the elevator car 1 in the operation unit picks up/drops off passengers, it arrives at the switching rail 41 of Floor n, and enters the upward secondary rail 31 through the switching rail 41 again to transport passengers arriving at the topmost unit. After all the passengers are sent to their floors, the elevator car 1 is switched to the upward primary rail 21 on Floor n−3, and moves upward to enter the top-floor rail 81. The rack of the top-floor cart 82 interconnects the upward primary rail 21, so the elevator car 1 can drive into the top-floor cart 82, which transports it to the downward secondary rail 32. The elevator car 1 moves downward to Floor n−1 and enters the switching rail 41 to complete its operation in one unit. Then it continuously moves downward until it finishes its travel in the last unit and arrives at Floor 1. Afterward, the elevator car 1 moves to the downward secondary rail 32 and gets transported by the transfer cart 51 to the elevator entrance on Floor 1 for passenger drop-off. When the elevator car 1 is empty, it continuously moves downward along the shaft connecting the first floor and the basement. The elevator cars 1 are transported to the rails at the opposite side from the entrance of the rails by the transfer carts 51 along the circular rail 61 and then randomly dispatched to the shafts upward connected to the first floor. As shown, after arriving at the first floor, the elevator car 1 picks up passengers at the elevator entrance and is then transported to the upward primary rail 21 along the transfer rail 52 before moving upward to complete one cycle of this elevator car 1. The number of the elevator cars 1 may vary depending on practical needs. The elevator cars 1 operate independently in a cycling manner without interfering each other. A broken elevator car 1 is transported to the service rail 62 without interfering normal operation of the other elevator cars 1.

Taking an 80-story building for example, assuming that every elevator car 1 can accommodate up to 10 persons, and every unit covers four floors, every elevator car 1 stops at two units. Depending on various parameters, the maximum running speed of the elevator is 4 m/s, so the urgent braking acceleration is about $m/s^2$, which means the minimum safety distance between the elevator cars 1 is about 4 m. Generally, it takes 2 s for the elevator to open and close the doors in average, and it takes is for each passenger to move in/out the elevator. When the elevator car 1 is fully loaded, it takes 14 s for passengers to enter the elevator car 1 and 42*s* for passengers to leave the elevator car 1. The rail switching operation takes 10 s. The elevator car 1 stays in the primary rail mechanism 2 for 80 s and stays in the secondary rail mechanism 3 for 16 s. To sum up, it takes 162 s for an elevator car 1 to move from the first floor to the topmost two units. It takes 94 s for a passenger to arrive at the designated floor in average. One elevator car 1 can be safely sent upward in two seconds, so there would be 150 cars/time in 5 minutes. The maximum transportation capacity is up to 1500 persons/time.

Embodiment 7

FIG. 28 through FIG. 33 shows a seventh mode of the smart multi-car elevator of the present invention.

In the present embodiment, the primary rail mechanism 2 and the secondary rail mechanism 3 are divided into n units according to the number of the floors. The number of the floors covered by each unit is determined according to practical needs. Every unit has a switching mechanism 4.

In the present embodiment, the primary rail mechanism 2 comprises an upward main chain rail 26 and a downward main chain rail 27. The upward main chain rail 26 and the downward main chain rail 27 both have a plurality of car lifting platforms 28 fixed thereon so that each floor has one car lifting platform 28. Every elevator car 1 corresponds to one car lifting platform 28. When the elevator car 1 is at the primary rail mechanism 2, it performs lifting or lowering movement through the car lifting platform 28. The car lifting platform 28 is provided with a positioning recess 281, and the elevator car 1 has a positioning bulge at its bottom to match the positioning recess 281.

In the present embodiment, the primary rail mechanism 2 further comprises an auxiliary fixed guide 29, and the elevator car 1 has a stabilizing brace 18. The stabilizing brace 18 has its one end hinged with the elevator car 1 and the other end fittingly connected to the auxiliary fixed guide 29. The stabilizing brace 18 slides along the auxiliary fixed guide 29. The stabilizing brace 18 when driven by a cylinder rotates to become connected to or away from the auxiliary fixed guide 29. During operation, the stabilizing brace 18 on the elevator car 1 is meshed with the auxiliary fixed guide 29, thereby ensuring stable movement of the elevator car 1. When the elevator car 1 is to leave the primary rail mechanism 2, the stabilizing brace 18 rotates upward by 90° to unlock elevator car 1 from the auxiliary fixed guide 29.

In the present embodiment, there are four upward main chain rails 26 and four downward main chain rails 27, distributed at four corners of the elevator car 1, respectively. Each of the upward main chain rails 26 or the downward main chain rails 27 is equipped with one auxiliary fixed guide 29.

In the present embodiment, the secondary rail mechanism 3 is divided into an upward secondary mechanism and a downward secondary mechanism. The upward secondary mechanism and the downward secondary mechanism are located between the upward main chain rail 26 and the downward main chain rail 27. The floor is located between the upward secondary mechanism and the downward secondary mechanism. The secondary rail mechanism 3 comprises hoist devices. Every unit has one hoist device. The hoist device comprises a hoist box 33, a hoist rope 34 and a cage 35. The hoist box 33 is fixed to the top of the corresponding unit. The hoist rope 34 has its one end wound around the hoist box 33, and the other end fixedly connected to the cage 35. The cage 35 at the side facing the car lifting platform 28 has an approach to the elevator car 1. The hoist box 33 drives the cage 35 to perform lifting or lowering movement through the hoist rope 34. The secondary rail mechanism 3 further comprises a weight 36 that is fixedly connected to one end of the hoist rope 34.

In the present embodiment, the switching mechanism 4 comprises a gangway 43. The gangway 43 is hinged to the lateral of the cage 35. The gangway 43 is driven by the cylinder to rotate so as to abut against the cage 35 or extend to link to the car lifting platform 28.

In the present embodiment, the car lifting platform 28 and the cage 35 each have a hydraulic jack to push the elevator car 1 to switch in the primary rail mechanism 2 and the secondary rail mechanism 3.

In the present embodiment, the transfer mechanism 5 comprises transfer carts 51, transfer rails 52 and an auxiliary transfer hoistway 53, and the first floor has a plurality of elevator entrances. The elevator entrances are arranged into two rows, not all elevator doors being aligned with the corresponding elevator entrances. The primary rail mechanism 2 and the secondary rail mechanism 3 are vertically arranged between the two rows of the elevator entrances. The secondary rail mechanism 3 is located between the upward main chain rail 26 and the downward main chain rail 27. There are two auxiliary transfer hoistways 53, each located at the outside of the upward main chain rail 26 or the downward main chain rail 27. Every elevator entrance is provided with one transfer cart 51. The secondary rail mechanism 3 is linked to the auxiliary transfer hoistways 53 directly or through transfer rails 52. The transfer carts 51 move on the transfer rails 52. The elevator cars 1 are transported to different elevator entrance through the transfer carts 51.

In the present embodiment, the auxiliary transfer hoistway 53 is located in the bottommost floor unit and is provided therein with a hoist device and a switching mechanism 4.

In the present embodiment, the system further comprises a top-floor rail mechanism 8. The top-floor rail mechanism 8 comprises an elliptic, closed top-floor rail 81, two auxiliary lifting hoistway 83 and at least one top-floor cart 82. The top-floor cart 82 is slidably mounted on the top-floor rail 81. The upward secondary mechanism, the downward secondary mechanism and the auxiliary lifting hoistway 83 are linked through the top-floor cart 82.

In the present embodiment, there are two auxiliary lifting hoistways 83 located in the unit of the topmost floor. The auxiliary lifting hoistway 83 is located at the outside of the primary rail mechanism 2. The auxiliary lifting hoistway 83 is provided therein with a hoist device and a switching mechanism 4.

Figure 28:
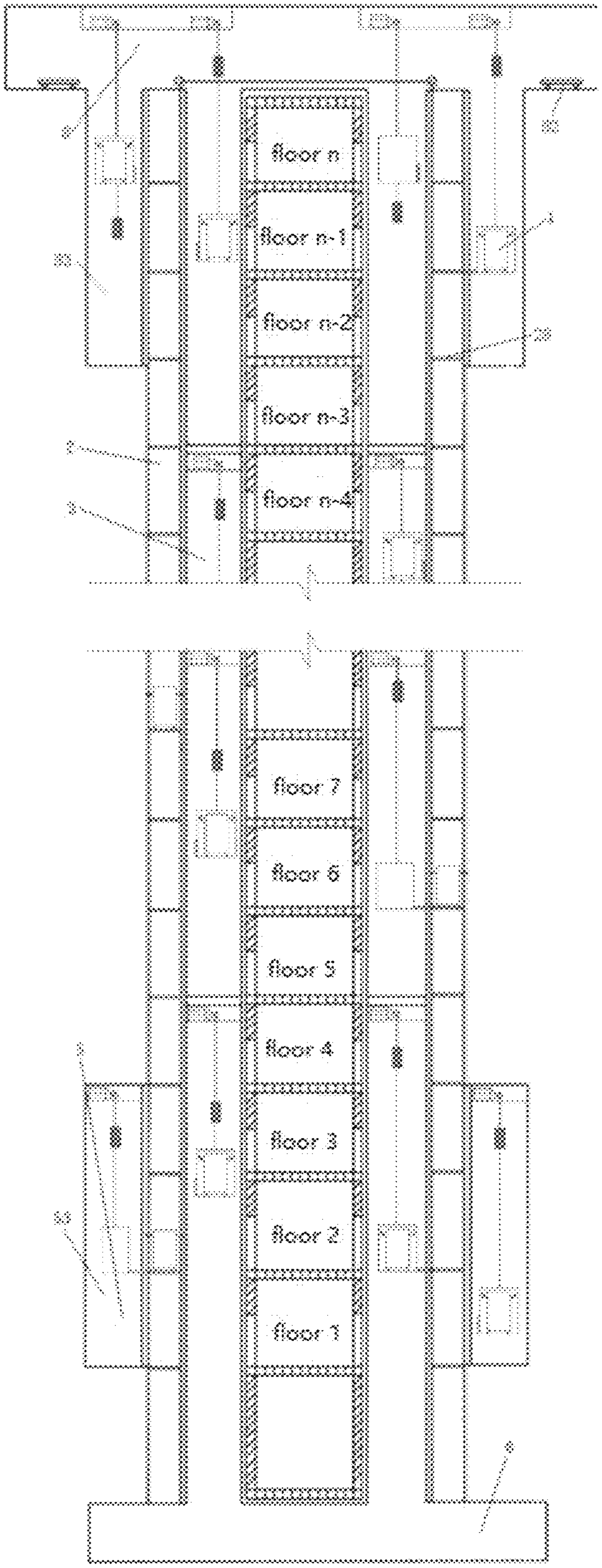
FIG. 28 is a schematic structural drawing of Embodiment 7 of the present invention.
Figure 29:
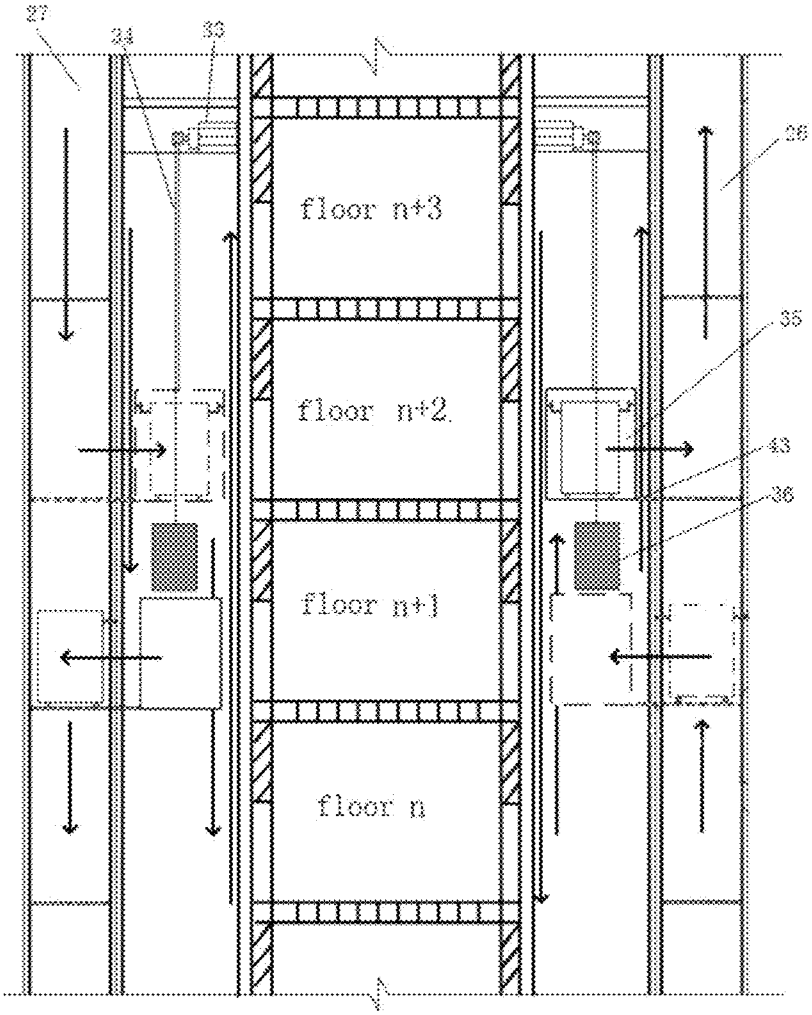
FIG. 29 is a local schematic structural drawing of Embodiment 7 of the present invention.

As shown in FIG. 28 and FIG. 29, the elevator car 1 moves upward in the upward main chain rail 26 with a constant speed. When a passenger at any of Floor n through Floor n+3 call the elevator or when there is a passenger in the elevator car 1 heading to any of Floor n through Floor n+3, the cage 35 in the upward secondary mechanism accelerates to become as fast as the upward main chain rail 26, and the gangway 43 extends to connect to and combine with the car lifting platform 28. Then the stabilizing brace 18 rotate upward to release the engagement with the auxiliary fixed guide 29. The elevator car 1 is pushed into the cage 35 from the car lifting platform 28. The gangway 43 retracts. After the elevator car 1 is lifted to Floor n+3, it moves downward along the floors for allowing passenger access. After picking up or dropping off the passengers on Floor n, the cage 35 accelerates to become static with respect to the upward main chain rail 26. The gangway 43 extends. The elevator car 1 is pushed back to the primary rail mechanism 2 and gets locked with the auxiliary fixed guide 29. Then the elevator car 1 continues to move upward to the next unit. Downward movement is performed similarly.

Figure 30:
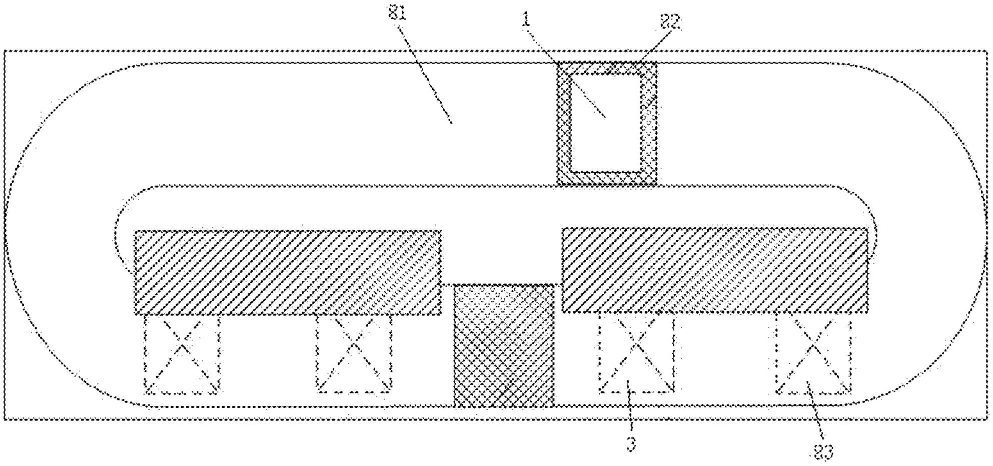
FIG. 30 is a schematic structural drawing of a top-floor rail according to Embodiment 7 of the present invention.

As shown in FIG. 30, when the elevator car 1 arrives at the unit near the top floor, if there is no passengers in the top-floor unit who call the elevator and there is no passengers in the elevator car 1 arriving at the top-floor unit, the elevator car 1 enters the upward auxiliary lifting hoistway 83 and gets lifted to the top-floor rail 81. The elevator car 1 is then transported to the downward auxiliary lifting hoistway 83 by the top-floor cart 82 and switched to the downward main chain rail 27 to move downward. If there is any passenger in the top-floor unit calling the elevator or there is any passenger in the elevator car 1 arriving at the top-floor unit, the elevator car 1 enters the upward secondary mechanism to transport the passenger(s). After it is confirmed that the elevator car 1 is empty, the elevator car 1 enters the upward secondary mechanism where it is lifted to the top-floor rail 81.

Figure 31:
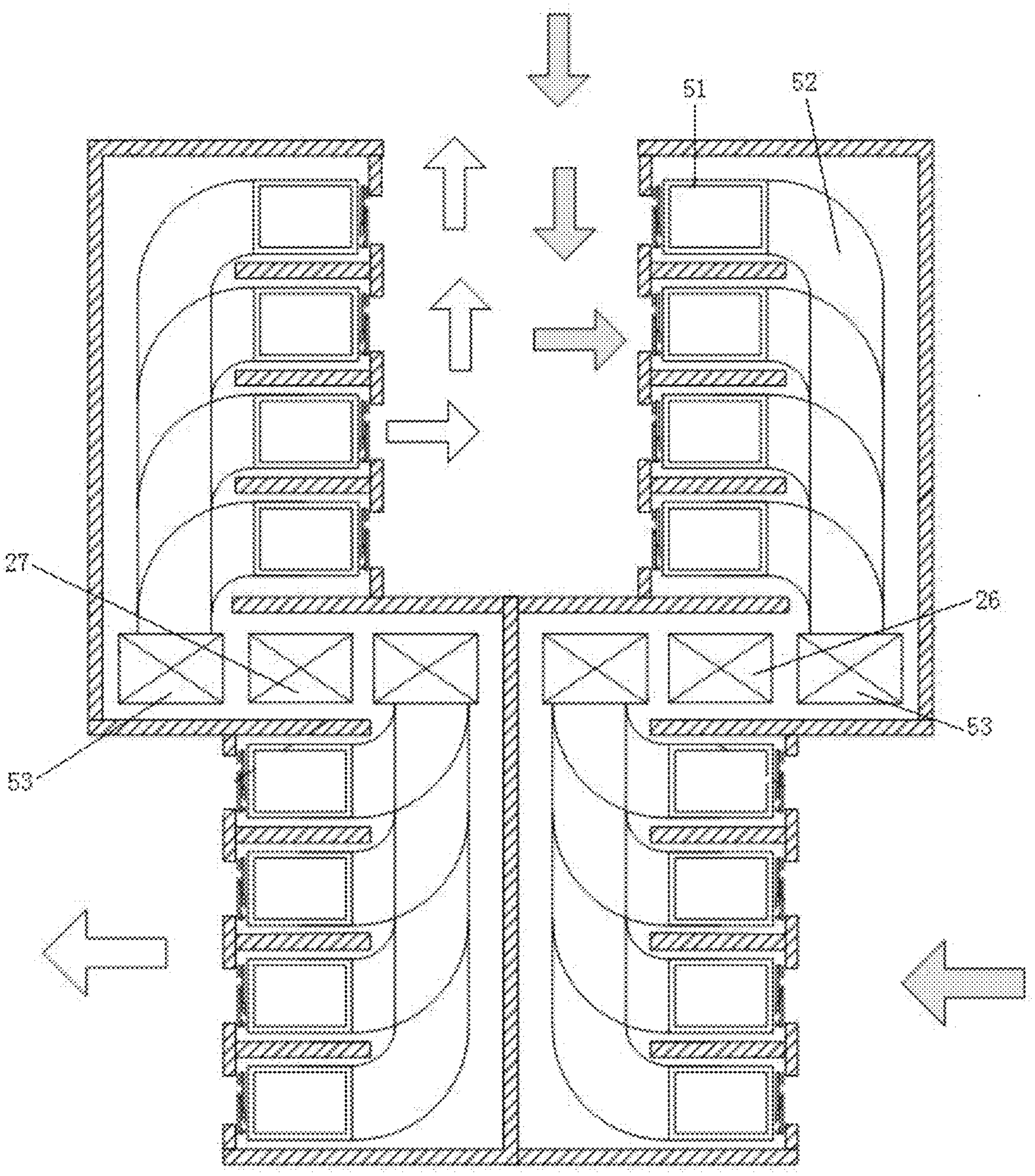
FIG. 31 is a schematic structural drawing of a transfer mechanism according to Embodiment 7 of the present invention.
Figure 32:
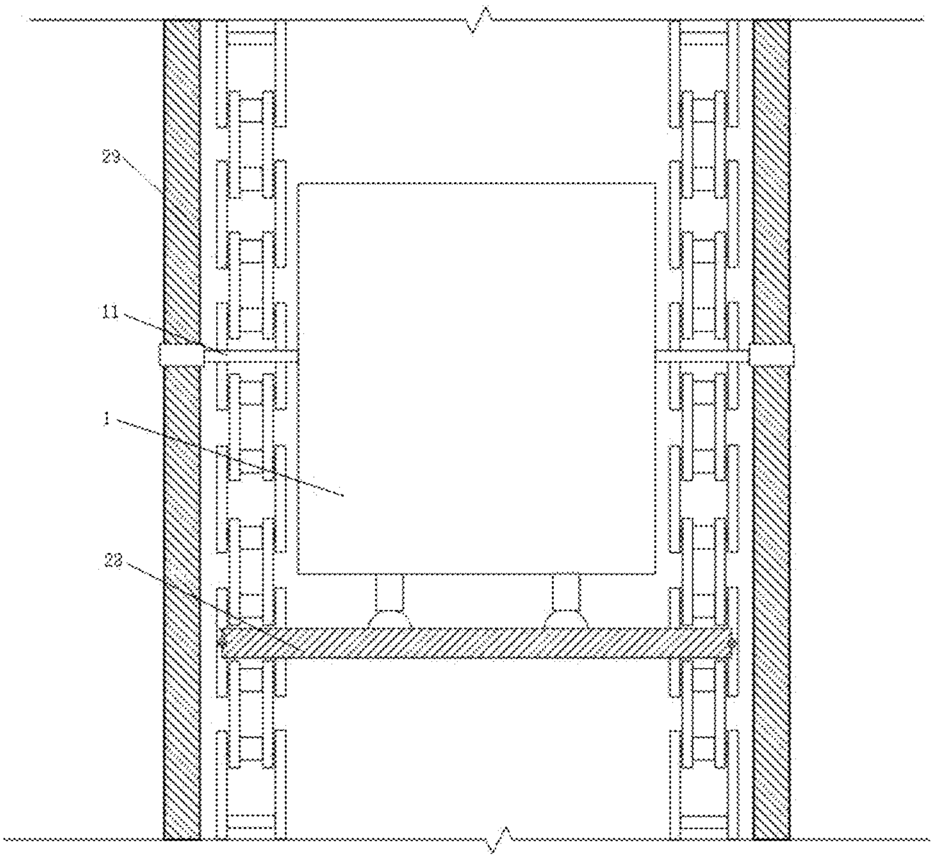
FIG. 32 is a schematic structural drawing of a primary rail mechanism according to Embodiment 7 of the present invention.
Figure 33:
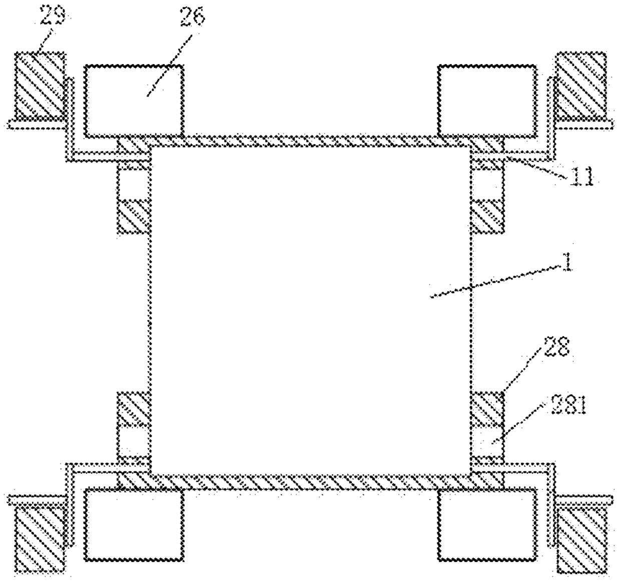
FIG. 33 is a top view according to FIG. 32.

As shown in FIG. 31, when the downward-going elevator car 1 arrives at the bottommost unit, if there is no passengers in the elevator car 1, the elevator car 1 enters the downward auxiliary transfer hoistway 53 and goes to the first floor, and if there is any passenger then, the elevator car 1 enters the downward secondary mechanism to transport the passenger(s) before going to the first floor.

Embodiment 8

The eighth mode of the smart multi-car elevator of the present invention is an elevator system that uses a linear motor as its power mechanism.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A smart multi-car elevator system, at least comprising:

a plurality of hoistways;

a switching mechanism;

a power mechanism; and a plurality of elevator cars, wherein the hoistways are equipped therein rails for operation, the switching mechanism is provided between said hoistways, the elevator car moves between two of the hoistways by the switching mechanism, the elevator cars are driven by the power mechanism to perform upward-moving/downward-moving or movement;

a smart control system that has a weight detecting module, a sensing module, a processing module and a safety module;

the weight detecting module is mounted on the elevator cars, for providing detected data to the processing module for storage and for development of a database;

the sensing module provides detected data to the processing module;

the processing module allocates a number of said elevator cars to be dispatched accordingly; and when determining that the system has a breakdown, the processing module signals the safety module to reduce a number of said elevator cars to release.

2. The smart multi-car elevator system of claim 1, each said floor is provided with an upward elevator gateway.

3. The smart multi-car elevator system of claim 1, wherein each said hoistway is equipped therein with an operation rail for the elevator cars to move along, so that the elevator cars when driven by the power mechanism moves upward or downward along the operation rail.

4. The smart multi-car elevator system of claim 1, wherein the switching mechanism comprises switching rails, switching rails are hinged inside the hoistways and the switching rails are arranged in a length direction of the shafts;

the switching mechanism further comprises switching drivers, each said switching rail has one switching driver, the switching rail is centrally hinged to the shaft.

5. The smart multi-car elevator system of claim 1, wherein the system further comprises a transfer mechanism, and a main gateway floor in the floors has a plurality of elevator gateways, the elevator cars move among the elevator gateways through the transfer mechanism;

the transfer mechanism comprises a transfer cart and a plurality of transfer rails, in which each said elevator gateway corresponds to one said transfer cart, and the hoistway is connected to the elevator gateways at laterals thereof, so that the transfer cart moves along the transfer rails.

6. The smart multi-car elevator system of claim 5, wherein the system further comprises a service mechanism located the transfer mechanism, and the service mechanism comprises a circular rail and the transfer carts, the elevator cars moving downward along the hoistway to the circular rail, the elevator cars moving on the circular rail through the transfer carts, and the elevator cars resting on the circular rail when not in use.

7. The smart multi-car elevator system of claim 6, wherein the power mechanism comprises a primary power mechanism and a switching power mechanism, and the elevator cars are driven by the primary power mechanism to perform upward-moving/downward-moving; the elevator cars are driven by the switching power mechanism to perform movement.

8. The smart multi-car elevator system of claim 2, wherein the system further comprises a top-floor rail mechanism located on a top floor among the floors, and the top-floor rail mechanism comprises an elliptic, closed top-floor rail and a plurality of top-floor carts, the top-floor rail is linked with the hoistway so that the top-floor carts slides on the top-floor rail, and the elevator cars are configured to switch positions between the hoistways through the top-floor carts.

9. The smart multi-car elevator system of claim 1, wherein the system further comprises a primary rail mechanism, a secondary rail mechanism, and a service mechanism, the switching mechanisms link the primary rail mechanism and the secondary rail mechanism, the elevator cars switch between the primary rail mechanism and the secondary rail mechanism when driven by the switching mechanisms; the service mechanism is connected to each said elevator entrance of the main gateway floor; the elevator cars when driven by the power mechanism perform lifting or lowering movement or switching movement; during operation, the elevator cars move upward or downward simultaneously in the primary rail mechanism, and each said elevator car when driven by the switching mechanism respectively switches from the primary rail mechanism to the secondary rail mechanism for allowing passenger access.

10. The smart multi-car elevator system of claim 9, wherein the primary rail mechanism comprises an upward primary rail and a downward primary rail, and the secondary rail mechanism comprises an upward secondary rail and a downward secondary rail, in which the upward secondary rail and the downward secondary rail are located between the upward primary rail and the downward primary rail, and floor access channels are located between the upward secondary rail and the downward secondary rail.

11. The smart multi-car elevator system of claim 10, wherein the switching mechanism comprises a plurality of switching rails that are arranged alternately and in pairs in an upward or downward direction of the elevator cars and switching drivers; the switching rail, when driven by the switching driver, rotates to become connected with the primary rail mechanism and the secondary rail mechanism or to become away from the primary rail mechanism and the secondary rail mechanism.

12. The smart multi-car elevator system of claim 11, wherein the primary rail mechanism and the secondary rail mechanism are divided into n units according to a number of the floors, and each said unit has an upper end and a lower end thereof provided with the switching mechanisms, in which the switching rails at the upper end and the lower end are arranged symmetrically.

13. The smart multi-car elevator system of claim 10, wherein the upward primary rail, the downward primary rail, the upward secondary rail, the downward secondary rail and the switching rail are all rack rails each composed of a steel frame, a fixing groove and a rack, in which the steel frame has one side thereof provided with the rack and an opposite side thereof provided with the fixing groove, so that the rack and power mechanism are engaged with each other while the fixing groove and power mechanism are meshed with each other.

14. The smart multi-car elevator system of claim 9, wherein the primary rail mechanism and the secondary rail mechanism are divided into n units according to a number of the floors, and each said unit is provided with the switching mechanism.

15. The smart multi-car elevator system of claim 14, wherein the primary rail mechanism comprises an upward main chain rail and a downward main chain rail each provided with a plurality of car lifting platforms so that each said elevator car corresponds to one said car lifting platform, and the elevator cars, when being on the primary rail mechanism, are driven by the car lifting platforms to perform lifting or lowering movement.

16. The smart multi-car elevator system of claim 15, wherein the secondary rail mechanism is divided into an upward secondary mechanism and a downward secondary mechanism located between the upward main chain rail and the downward main chain rail, the secondary rail mechanism comprises hoist devices so that each said unit is provided with one said hoist device, the hoist device comprises a hoist box, a hoist rope and a cage, wherein the hoist box is fixed to a top of the corresponding unit, the hoist rope has one end thereof wound on the hoist box and an opposite end fixedly connected to the cage, the cage has an approach to the elevator car at one side thereof that faces the car lifting platform.

17. The smart multi-car elevator system of claim 16, wherein the switching mechanism comprises a gangway that is hinged to a lateral of the cage and the gangway is driven by a cylinder to rotate to abut against the cage or link the car lifting platform.

18. The smart multi-car elevator system of claim 17, wherein the transfer mechanism comprises transfer cart, a plurality of transfer rail and auxiliary transfer hoistway, and the main gateway floor has a plurality of elevator entrances, the elevator entrances are arranged into two rows, not all elevator doors are aligned with the corresponding elevator entrances, the primary rail mechanism and the secondary rail mechanism are vertically arranged between the two rows of the elevator entrances, the secondary rail mechanism is located between the upward main chain rail and the downward main chain rail; two said auxiliary transfer hoistways are located at outsides of the upward main chain rail and the downward main chain rail, respectively; the secondary rail mechanism is linked to the elevator entrances directly or through the auxiliary transfer hoistway by the through transfer rails, and the transfer carts are configured to move on the transfer rails.

19. The smart multi-car elevator system of claim 1, wherein the weight detecting module is used for recording weights of the elevator cars in each time window and on each floor;

the sensing module is used for detecting running speeds and temperatures of the elevator cars;

the processing module identifies peak hours and intensively accessed floors according to data in the database to allocate the number of the elevator cars to be dispatched.

* * * * *